(12) United States Patent
Jin

(10) Patent No.: US 9,083,945 B2
(45) Date of Patent: *Jul. 14, 2015

(54) KEYFRAME SELECTION FOR ROBUST VIDEO-BASED STRUCTURE FROM MOTION

(71) Applicant: Adobe Systems Incorporated, San Jose, CA (US)

(72) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/724,906

(22) Filed: Dec. 21, 2012

(65) Prior Publication Data
US 2013/0266180 A1    Oct. 10, 2013

Related U.S. Application Data

(60) Provisional application No. 61/621,365, filed on Apr. 6, 2012.

(51) Int. Cl.
*H04N 13/00* (2006.01)
*H04N 5/232* (2006.01)
(Continued)

(52) U.S. Cl.
CPC .............. *H04N 13/00* (2013.01); *G06K 9/3233* (2013.01); *G06K 9/3241* (2013.01); *G06K 9/4652* (2013.01); *G06T 5/001* (2013.01); *G06T 7/0071* (2013.01); *H04N 5/232* (2013.01);
(Continued)

(58) Field of Classification Search
CPC ... G06T 7/0018; G06T 7/0022; G06T 7/0038; G06T 7/0071; G06T 7/20; G06T 2207/10016; G06T 2207/30244; H04N 13/0207; H04N 13/021; H04N 13/0221

USPC .......... 382/100, 103, 107; 348/169, 699, 700; 345/473, 474, 475

See application file for complete search history.

(56) References Cited

U.S. PATENT DOCUMENTS

| 4,885,713 A | 12/1989 | Miller ........................... 364/604 |
| 5,692,063 A | 11/1997 | Lee et al. ...................... 382/107 |

(Continued)

OTHER PUBLICATIONS

Bruce D. Lucas and Takeo Kanade. An Iterative Image Registration Technique with an Application to Stereo Vision. International Joint Conference on Artificial Intelligence, pp. 674-679, 1981.

(Continued)

*Primary Examiner* — Andrew W Johns
(74) *Attorney, Agent, or Firm* — Wolfe-SBMC

(57) ABSTRACT

An adaptive technique is described for iteratively selecting and reconstructing keyframes to fully cover an image sequence that may, for example, be used in an adaptive reconstruction algorithm implemented by a structure from motion (SFM) technique. A next keyframe to process may be determined according to an adaptive keyframe selection technique. The determined keyframe may be reconstructed and added to the current reconstruction. A global optimization may be performed on the current reconstruction. One or more outlier points may be determined and removed from the reconstruction. One or more inlier points may be determined and recovered. If the number of inlier points that were added exceeds a threshold, then global optimization may again be performed. If the current reconstruction is a projective construction, self-calibration may be performed to upgrade the projective reconstruction to a Euclidean reconstruction.

21 Claims, 14 Drawing Sheets

(51) Int. Cl.
*H04N 17/00* (2006.01)
*G06K 9/32* (2006.01)
*G06K 9/46* (2006.01)
*G06T 5/00* (2006.01)
*G06T 7/00* (2006.01)

(52) U.S. Cl.
CPC ... *H04N 17/002* (2013.01); *G06T 2207/10016* (2013.01); *G06T 2207/30241* (2013.01); *G06T 2207/30244* (2013.01)

(56) References Cited

U.S. PATENT DOCUMENTS

| | | | |
|---|---|---|---|
| 5,748,789 A | 5/1998 | Lee et al. | 382/243 |
| 5,787,203 A | 7/1998 | Lee et al. | 382/232 |
| 6,760,488 B1 | 7/2004 | Moura et al. | 382/285 |
| 7,177,740 B1 | 2/2007 | Guangjun et al. | 701/34 |
| 7,356,082 B1 | 4/2008 | Kuhn | 375/240.16 |
| 7,477,762 B2 | 1/2009 | Zhang et al. | 382/107 |
| 8,248,476 B2 | 8/2012 | Ke et al. | 348/187 |
| 8,259,994 B1 | 9/2012 | Anguelov et al. | 382/100 |
| 8,437,501 B1 | 5/2013 | Anguelov et al. | 382/100 |
| 8,693,734 B2* | 4/2014 | Jin | 382/107 |
| 8,873,846 B2 | 10/2014 | Jin | H04N 13/00 |
| 8,923,638 B2 | 12/2014 | Jin | H04N 13/00 |
| 8,934,677 B2 | 1/2015 | Jin | H04N 13/00 |
| 8,942,422 B2 | 1/2015 | Jin | H04N 13/00 |
| 2003/0103682 A1 | 6/2003 | Blake et al. | 382/282 |
| 2010/0079598 A1 | 4/2010 | Ke et al. | 348/187 |
| 2010/0142846 A1 | 6/2010 | Tolliver et al. | 382/274 |
| 2010/0245593 A1 | 9/2010 | Kim et al. | 348/188 |
| 2011/0007138 A1 | 1/2011 | Zhang et al. | 348/50 |
| 2011/0025853 A1 | 2/2011 | Richardson | 348/159 |
| 2011/0064308 A1 | 3/2011 | Stein et al. | 382/170 |
| 2011/0311104 A1 | 12/2011 | Sinha et al. | 382/106 |
| 2013/0044186 A1* | 2/2013 | Jin et al. | 348/46 |
| 2013/0044913 A1* | 2/2013 | Jin et al. | 382/103 |
| 2013/0058581 A1 | 3/2013 | Zhang et al. | 382/201 |
| 2013/0230214 A1 | 9/2013 | Arth et al. | 382/107 |
| 2013/0265387 A1 | 10/2013 | Jin | H04N 13/00 |
| 2013/0265439 A1 | 10/2013 | Jin | H04N 5/232 |
| 2013/0265443 A1 | 10/2013 | Jin | H04N 17/002 |
| 2013/0266179 A1 | 10/2013 | Jin | G06K 9/3233 |
| 2013/0266218 A1 | 10/2013 | Jin | G06K 9/4652 |
| 2013/0266238 A1 | 10/2013 | Jin | G06T 5/001 |
| 2015/0030206 A1 | 1/2015 | Jin | G06T 7/204 |

OTHER PUBLICATIONS

Jianbo Shi and Carlo Tomasi. Good Features to Track. IEEE Conference on Computer Vision and Pattern Recognition, pp. 593-600, 1994.
D. Nister. An efficient solution to the five-point relative pose problem. IEEE Transactions on Pattern Analysis and Machine Intelligence 26(6) 756-770, Jun. 2004.
Martin A. Fischler and Robert C. Bolles. Random Sample Consensus: A Paradigm for Model Fitting with Applications to Image Analysis and Automated Cartography. Comm. of the ACM 24 (6) (1981), pp. 381-395.
Richard Hartley and Andrew Zisserman, Multiple View Geometry, CVPR Jun. 1999. pp. 1-240.
Laurent Kneip, Davide Scaramuzza, and Roland Siegwart. A Novel Parameterization of the Perspective-Three-Point Problem for a Direct Computation of Absolute Camera Position and Orientation. In Proc. IEEE Computer Vision and Pattern Recognition, 2011. pp. 1-8.
M. Brown, R. Hartley and D. Nister. Minimal Solutions for Panoramic Stitching. In Proc. International Conference on Computer Vision and Pattern Recognition, Jun. 2007. pp. 1-8.
E. Hemayed, A survey of camera self-calibration. In Proceedings IEEE Conference on Advanced Video and Signal Based Surveillance, 2003. pp. 1-7.

Riccardo Gherardi and Andrea Fusiello, Practical Autocalibration. In Proceedings European Conference on Computer Vision, 2010. pp. 1-12.
M. Pollefeys, R. Koch and L. Van Gool. Self-Calibration and Metric Reconstruction in spite of Varying and Unknown Internal Camera Parameters. International Journal of Computer Vision, 32(1), 1999. pp. 1-18.
Jin, Hailin, Paolo Favaro, and Stefano Soatto. "Real-time feature tracking and outlier rejection with changes in illumination." Computer Vision, 2001. ICCV 2001. Proceedings. Eighth IEEE International Conference on. vol. 1. IEEE, 2001. pp. 1-12.
Tsai, R. Y. and Huang, T.S. Estimating three-dimensional motion parameters of a rigid planar patch, II: singular value decomposition. IEEE Transactions on Acoustics, Speech and Signal Processing, vol. ASSP-30, pp. 525-534, Aug. 1982.
Weng, J., Ahuja, N., and Huang, T.S. Motion and Structure from Point Correspondences with Error Estimation: Planar Surfaces. IEEE Transactions on Signal Processing, 39(12), 1991, pp. 1-27.
Longuet-Higgins, H.C. The visual ambiguity of a moving plane. Proceedings of the Royal Society of London, 1984, pp. 1-12.
Waxman, A. M. and Wohn, K. Contour evolution, neighborhood deformation and global image flow: Planar surfaces in motion. International Journal of Robotics Research, 4(3), 1985, pp. 1-15.
Richard Szeliski and P. H. S. Torr. Geometrically Constrained Structure from Motion: Points on Planes. European Workshop on 3D Structure from Multiple Images of Large-Scale Environments (SMILE), 1998, pp. 1-23.
Bartoli, A. and Sturm, P. Constrained Structure and Motion From Multiple Uncalibrated Views of a Piecewise Planar Scene. International Journal on Computer Vision, 52(1), 2003, pp. 1-42.
Philip H. S. Torr, Andrew W. Fitzgibbon, and Andrew Zisserman. The problem of degeneracy in structure and motion recovery from uncalibrated image sequences. International Journal of Computer Vision, 32(1), 1999, pp. 1-20.
Marc Pollefeys, Frank Verbiest, and Luc Van Gool. Surviving dominant planes in uncalibrated structure and motion recovery. In Proceedings of European Conference on Computer Vision, 2002, pp. 1-14.
O. Chum, T. Werner, and J. Matas. Two-view geometry estimation unaffected by a dominant plane. In Proceedings of IEEE Conference on Computer Vision and Pattern Recognition, 2005, pp. 1-8.
Robert Kaucic, Nicolas Dano, and Richard Hartley. Plane-based projective reconstruction. In Proceedings of International Conference on Computer Vision, 2001, pp. 1-8.
Carsten Rother. Linear multi-view reconstruction of points, lines, planes and cameras using a reference plane. In Proceedings of International Conference on Computer Vision, 2003, pp. 1-8.
C. Baillard and A. Zisserman. Automatic reconstruction of piecewise planar models from multiple views. In Proceedings of IEEE Conference on Computer Vision and Pattern Recognition, 1999, pp. 1-7.
Friedrich Fraundorfer, Konrad Schindler, and Horst Bischof. Piecewise planar scene reconstruction from sparse correspondences. Image and Vision Computing, 24(4), 2006, pp. 395-406.
Kanazawa, Y. and Kawakami, H. Detection of planar regions with uncalibrated stereo using distributions of feature points. In British Machine Vision Conference (BMVC), Kingston upon Thames, London, Sep. 2004, vol. 1, pp. 247-256.
Piazzi, J. and Prattichizzo, D. Plane Detection with stereo images. In International Conference Robotics and Automation, 2006, pp. 1-6.
Vincent, E. and Laganiere, R. Detecting planar homographies in an image pair. In International Symposium on Image and Signal Processing and Analysis, 2001, pp. 1-6.
Lopez-Nicolas, G., Guerrero, J.J., Pellejero, O.A., and Sagues, C. Computing homographies from three lines or points in an image pair. In ICIAP'05 Proceedings of the 13th international conference on Image Analysis and Processing, pp. 446-453 (2005).
David F. Fouhey, Daniel Scharstein, and Amy J. Briggs. Mulitple plane detection in image pairs using j-linkage. In Proc. 20th International Conference on Pattern Recognition (ICPR 2010), Istanbul, Turkey, Aug. 2010, pp. 1-4.
Manolis I.A. Lourakis, Antonis A. Argyros and Stelios C. Orphanoudakis. Detecting planes in an uncalibrated image pair. In Proc. BMVC'02, vol. 2, 2002, pp. 587-596 (2002).

(56) References Cited

OTHER PUBLICATIONS

Johann Prankl, Michael Zillich, Bastian Leibe, and Markus Vincze. Incremental model selection for detection and tracking of planar surfaces. In Proceedings of British Machine Vision Conference, 2010, p. 1.

Benoit Bocquillon, Pierre Gurdjos, and Alain Crouzil. Towards a guaranteed solution to plane-based selfcalibration. In ACCV, pp. 11-20, 2006.

M. Pollefeys, L.J.V. Gool, M. Vergauwen, F. Verbiest, K. Cornelis, J. Tops and R. Koch, "Visual Modeling with a Hand-Held Camera", International Journal of Computer Visioin, vol. 59(3), pp. 207-232, 2004.

P. Gurdjos and P. Sturm. Methods and geometry for plane-based self-calibration. In CVPR, 2003, pp. 1-6.

Y. Ma, J. Kosecka , S. Soatto, and S. Sastry. An Invitation to 3-D Vision, From Images to Models. Springer-Verlag, New York, 2004, pp. 1-338.

Ezio Malis and Roberto Cipolla. Camera self-calibration from unknown planar structures enforcing the multiview constraints between collineations. PAMI, 24(9):1268-1272, 2002.

J. F. Menudet, J. M. Becker, T. Fournel, and C. Mennessier. Plane-based camera self-calibration by metric rectification of images. Image and Vision Computing, 26:913-934, Jul. 2008.

Peter F. Sturm and Stephen J. Maybank. On plane-based camera calibration: A general algorithm, singularities, applications. In CVPR, pp. 432-437, 1999.

Bill Triggs. Autocalibration from planar scenes. In Proceedings of European Conference on Computer Vision (ECCV), 1998, pp. 1-20.

C. Engels, H. Stewenius, and D. Nister, "Bundle adjustment rules," In Photogrammetric Computer Vision (PCV'06), 2006, pp. 1-6.

Bill Triggs, Philip F. McLauchlan, Richard I. Hartley and Andrew W. Fitzgibbon, "Bundle Adjustment—A Modern Synthesis," Proceedings of the International Workshop on Vision Algorithms: Theory and Practice, 1999, pp. 1-71.

Lourakis, M., Argyros, A., "The design and implementation of a generic sparse bundle adjustment software package based on the Levenberg-Marquardt algorithm," Technical Report 340, Institute of Computer Science—FORTH (2004), pp. 1-23.

Zhang, J., Boutin, M., and Aliaga, D., "Robust bundle adjustment for structure from motion," Proceedings of the International Conference on Image Processing (ICIP), 2006, pp. 1-4.

N. Snavely, S. Seitz, and R. Szeliski, "Modeling the world from internet photo collections," International Journal of Computer Vision, vol. 80, No. 2, pp. 189-210, 2008.

U.S. Appl. No. 13/300,277, filed Nov. 11, 2011, Hailin Jin, et al.

U.S. Appl. No. 13/551,603, filed Jul. 17, 2012, Hailin Jin, et al.

U.S. Appl. No. 13/551,601, filed Jul. 17, 2012, Hailin Jin, et al.

"Non-Final Office Action", U.S. Appl. No. 13/725,006, Aug. 15, 2014, 5 pages.

"Notice of Allowance", U.S. Appl. No. 13/725,019, Jun. 23, 2014, 7 pages.

"Notice of Allowance", U.S. Appl. No. 13/725,006, Sep. 2, 2014, 7 pages.

"Corrected Notice of Allowance", U.S. Appl. No. 13/724,973, Dec. 24, 2014, 2 pages.

"Notice of Allowance", U.S. Appl. No. 13/724,871, Sep. 18, 2014, 6 pages.

"Notice of Allowance", U.S. Appl. No. 13/724,973, Oct. 9, 2014, 7 pages.

"Supplemental Notice of Allowance", U.S. Appl. No. 13/724,871, Oct. 14, 2014, 2 pages.

"Supplemental Notice of Allowance", U.S. Appl. No. 13/724,871, Nov. 24, 2014, 2 pages.

"Notice of Allowance", U.S. Appl. No. 13/724,945, Apr. 22, 2015, 6 pages.

* cited by examiner

KEYFRAME SELECTION FOR ROBUST VIDEO-BASED STRUCTURE FROM MOTION

PRIORITY INFORMATION

This application claims benefit of priority of U.S. Provisional Application Ser. No. 61/621,365 entitled "Structure from Motion Methods and Apparatus" filed Apr. 6, 2012, the content of which is incorporated by reference herein in its entirety.

BACKGROUND

Description of the Related Art

In computer vision, inferring rigid-body motions of a camera from a video or set of images is a problem known as Structure from Motion (SFM). In SFM, a task or goal is to estimate the camera motion from a set of point correspondences in a set of images or video frames. Obtaining Structure from Motion (SFM) algorithms is of importance because a successful SFM algorithm would enable a wide range of applications in different domains including 3D image-based modeling and rendering, video stabilization, panorama stitching, video augmentation, vision based robot navigation, human-computer interaction, etc.

SUMMARY

Various embodiments of Structure from Motion (SFM) techniques and algorithms are described that may be applied, for example, to find the three-dimensional (3D) structures of a scene, for example from a video taken by a moving video camera or from a set of images taken with a still camera, as well as systems that implement these algorithms and techniques. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences.

Embodiments of a general SFM technique are described that are generally directed to performing reconstruction for image sequences in which the camera motion includes a non-zero translation component. The general SFM technique estimates the rotation and translation components of the camera motion, and may also estimate the camera intrinsic parameters (e.g., focal length) if not known. In addition, the general SFM technique may be directed to performing reconstruction for image sequences in which the scene does not contain a dominant plane. Embodiments of the general SFM technique may implement an adaptive reconstruction algorithm that starts by adaptively determining and reconstructing an initial set of keyframes that covers only a part of an image sequence (e.g., a set of spaced frames somewhere in the middle of the sequence), and that incrementally and adaptively determines and reconstructs additional keyframes to fully cover the image sequence. In at least some embodiments, the adaptive reconstruction algorithm then adaptively determines and reconstructs optimization keyframes to provide a better reconstruction. The rest of the frames in the sequence may then be reconstructed based on the determined and reconstructed keyframes.

Embodiments of an adaptive technique are described for iteratively selecting and reconstructing keyframes to fully cover an image sequence. The technique may, for example, be used after an initialization technique that determines and reconstructs a set of initial keyframes covering a portion of the image sequence in an adaptive reconstruction algorithm implemented by a general SFM technique as described herein. In the adaptive keyframe selection and reconstruction technique, keyframes are processed until there are no more to process. A next keyframe to process may be determined according to an adaptive keyframe selection technique. In at least some embodiments of the adaptive keyframe selection technique, a next keyframe may be selected in either of two directions: before and after the current reconstructed set of keyframes. At least some embodiments may alternate between the two directions.

The determined keyframe may be reconstructed and thus added to the current reconstruction. A global optimization may be performed on the current reconstruction. One or more outlier points may be determined and removed from the reconstruction. One or more inlier points may be determined and recovered (added to the reconstruction). If the number of inlier points that were added exceeds a threshold, then a global optimization may again be performed on the current reconstruction. If the current reconstruction is already a Euclidian reconstruction, the technique determines if there are more keyframes to be processed and, if so, selects and processes a next frame. If the current reconstruction is a projective construction, and if there are enough frames processed to perform self-calibration, then self-calibration may be performed to upgrade the projective reconstruction to a Euclidean reconstruction. If the results of the self-calibration are accepted, the technique determines if there are more keyframes to be processed and, if so, selects and processes a next frame. Otherwise, the technique reverts to the reconstruction prior to the self-calibration attempt, determines if there are more keyframes to be processed and, if so, selects and processes a next frame.

Figure 1:
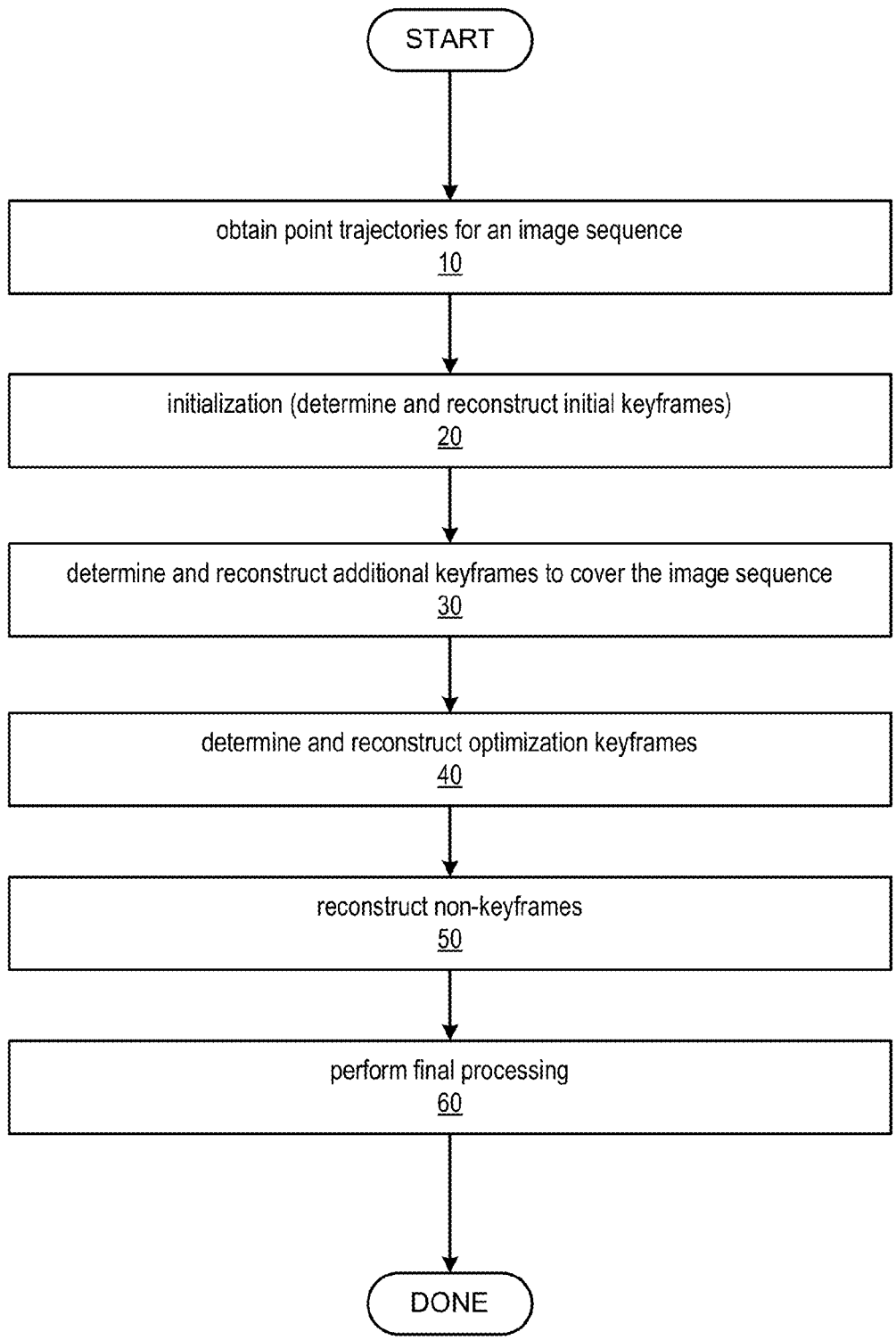
FIG. 1 is a high-level flowchart of a general adaptive reconstruction algorithm, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of Structure from Motion (SFM) techniques and algorithms are described that may be applied, for example, to find the three-dimensional (3D) structures of a scene, for example from a video taken by a moving video camera or from a set of images taken with a still camera. Systems that may implement these algorithms and techniques are also described. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences. Note that a distinct camera may be assumed for each image or frame in an image sequence. Thus, each frame or image in a sequence may be referred to as a "camera."

Embodiments of a general 3D reconstruction technique, which may also be referred to as a general SFM technique, are described that are generally directed to performing reconstruction for image sequences in which the camera motion includes a non-zero translation component. The general SFM technique estimates the rotation and translation components of the camera motion, and may also estimate the camera intrinsic parameters (e.g., focal length) if not known. In addition, the general SFM technique may be directed to performing reconstruction for image sequences in which the scene does not contain a dominant plane.

Embodiments of the general 3D reconstruction technique may implement embodiments of an adaptive reconstruction algorithm that starts by adaptively determining and reconstructing an initial set of keyframes that covers only a part of an image sequence (e.g., a set of spaced frames somewhere in the middle of the sequence), and that incrementally and adaptively determines and reconstructs additional keyframes to fully cover the image sequence. In at least some embodiments, the adaptive reconstruction algorithm then adaptively determines and reconstructs optimization keyframes to provide a better reconstruction. The rest of the frames in the sequence may then be reconstructed based on the determined and reconstructed keyframes. At least some embodiments of the adaptive reconstruction algorithm may be configured to handle both cases where the intrinsic camera parameters (e.g., focal length) are known (e.g., via user input or via metadata provided with the input image sequence) and cases where the intrinsic camera parameters are not known. The first case may be referred to herein as the calibrated case, and the second case may be referred to herein as the uncalibrated case. In at least some embodiments, in the calibrated case, a Euclidian (or metric) reconstruction technique may be applied. In at least some embodiments, in the uncalibrated case, a projective reconstruction technique may at least initially be applied. A self-calibration technique is described that may, for example be applied to produce a Euclidian (or metric) reconstruction in the uncalibrated case. In addition, at least some embodiments of the adaptive reconstruction algorithm may be configured to handle image sequences with either constant (fixed) focal length or varying focal length (e.g., resulting from zooming of the camera lens), in both the calibrated and uncalibrated cases.

FIG. 1 is a high-level flowchart of an adaptive reconstruction algorithm, according to at least some embodiments. As indicated at 10, point trajectories (which may also be referred to as feature trajectories) for an image sequence (e.g., a video sequence, or a set of still photographs) may be obtained. Each point trajectory tracks a feature (or point) across two or more of the images in the sequence. Note that a point trajectory may be referred to simply as a point in this context. As indicated at 20, an initialization technique may be performed to determine and reconstruct a set of initial keyframes covering a portion of the image sequence according to the point trajectories. As indicated at 30, an adaptive technique may then be performed to iteratively select and reconstruct additional keyframes to cover the image sequence. As indicated at 40, an opt-keyframe technique may then be performed to determine and reconstruct optimization keyframes to improve the quality of the reconstruction. As indicated at 50, non-keyframes (e.g., all frames that have not yet been included in the reconstruction) may be reconstructed. As indicated at 60, final processing may be performed. Output of the algorithm includes at least the camera intrinsic parameters and the Euclidean motion parameters for the images in the sequence. Each of elements 10 through 60 is discussed in more detail below.

Embodiments of feature tracking techniques are described that may be used to establish point trajectories over time in an input image sequence. The point trajectories may then, for example, be used as input to embodiments of the adaptive reconstruction algorithm in embodiments of the general 3D reconstruction technique. However, note that embodiments of the feature tracking techniques may be used in or with any method or technique that may be applied to image sequences and that requires point trajectories. For example, embodiments of the feature tracking techniques may be used to generate point trajectories in a plane-based reconstruction technique or a rotation-based reconstruction technique.

Embodiments of an initialization technique are described that may, for example, be used in the adaptive reconstruction algorithm described above. In the initialization technique, two initial keyframes are selected from a set of temporally spaced keyframe candidates, the two initial keyframes are reconstructed, and then one or more additional keyframes between the two initial keyframes are selected and reconstructed.

Embodiments of an adaptive technique are described for iteratively selecting and reconstructing additional keyframes to fully cover the image sequence; the technique may, for example, be used in the adaptive reconstruction algorithm described above. In this adaptive technique, in the uncalibrated case, a projective reconstruction technique may at least initially be applied, and a self-calibration technique may be applied to generate a Euclidian reconstruction.

Embodiments of a nonlinear self-calibration technique are described that may, for example, be used in the adaptive technique for iteratively selecting and reconstructing additional keyframes to fully cover the image sequence as described above. The nonlinear self-calibration technique may, for example, be used in the uncalibrated case to generate a Euclidian reconstruction. In contrast to conventional self-calibration methods that use linear or semi-linear algorithms, embodiments of the self-calibration technique use a nonlinear least squares optimization technique to infer the camera parameters. Note that embodiments of the nonlinear self-calibration technique may be used in other reconstruction or SFM techniques than those described herein, and in other image processing methods or techniques than SFM techniques.

Embodiments of a technique are described for selecting and reconstructing optimizing keyframes (which may be referred to as opt-keyframes) to provide a better reconstruction; the technique may, for example, be used in the adaptive reconstruction algorithm described above. This technique may add and reconstruct frames to the set of keyframes already generated by the initialization technique and the adaptive technique for iteratively selecting and reconstructing additional keyframes. In addition, the technique may determine and remove outlier points from the projection, and determine and recover inlier points in the projection. Adding the opt-keyframes and inlier points may result in additional, and possibly shorter, point trajectories being included in the reconstruction, thus providing a better reconstruction that may be more suited for later operations that may be applied to the image sequence, such as plane fitting.

In at least some embodiments of the adaptive reconstruction algorithm, in a final processing stage, to avoid including non-contiguous frames or cameras in the reconstruction, a largest contiguous subset of the frames may be determined. Frames that are not in this subset may be removed from the reconstruction. In addition, point trajectories that do not appear in this largest contiguous subset may be removed from the reconstruction. In some embodiments, a global optimization of the reconstruction may be performed in the final processing stage after the non-contiguous frames and point trajectories have been removed.

General 3D Reconstruction Technique

Introduction

Embodiments of a robust system for estimating camera motion (rotation and translation) in image sequences, a problem known in computer vision as Structure from Motion (SFM), are described. Embodiments of a general 3D reconstruction technique, which may also be referred to as a general SFM technique, are described that are generally directed to performing reconstruction for image sequences in which the camera motion includes a non-zero translation component. In other words, the camera has moved when capturing the image sequence. The general SFM technique estimates the rotation and translation components of the camera motion, and may also estimate the camera intrinsic parameters (e.g., focal length) if not known. In addition, the general SFM technique may be generally directed to performing reconstruction for image sequences in which the scene does not contain a dominant plane.

In at least some embodiments, input to the general SFM technique may include at least an input image sequence. Output may include the intrinsic camera parameters (e.g., focal length) and the Euclidean (or metric) motion parameters for the images in the sequence. In at least some embodiments, a non-zero camera translation is assumed in the image sequence. In addition, it may be assumed that the scene does not include a dominant plane across a portion or all of the image sequence.

In order to obtain a Euclidean reconstruction, the intrinsic parameters of the camera(s) used to capture the image sequence may need to be obtained. At least some embodiments of the general SFM technique may be configured to handle both cases where the intrinsic camera parameters (e.g., focal length) are known (e.g., via user input or via metadata provided with the input image sequence) and cases where the intrinsic camera parameters are not known. The first case may be referred to herein as the calibrated case, and the second case may be referred to herein as the uncalibrated case.

In at least some embodiments of the general SFM technique, in the case where the intrinsic parameters are not known (the uncalibrated case), one or more of the following assumptions may be made:
  the principal point of each image is known, as is the pixel aspect ratio. Note that both principal points may be allowed to change over time;
  there is no pixel skew. The only potential unknown intrinsic parameter is the focal length; and
  information on whether or not the focal length changes in the sequence is available.

From the above, in at least some embodiments of the general SFM technique, three different cases may be supported:
  calibrated; all the intrinsic parameters are known;
  uncalibrated, with a constant focal length; and
  uncalibrated, with a varying focal length.

At least some embodiments of the general SFM technique may implement an incremental approach to generating a reconstruction from an input image sequence. In particular, at least some embodiments of the general SFM technique may start from an initial subset of frames and add one or more frames at a time until the entire image sequence is processed.

As an alternative to the incremental approach that processes all the frames in an image sequence, embodiments of the general SFM technique may be applied to sub-sequences of frames in a divide-and-conquer approach. A divide-and-conquer approach divides the image sequence into sub-sequences, solves the sub-sequences, and recursively merges the sub-sequences to obtain a final result.

In at least some embodiments, high-level components of the general SFM technique may include a feature tracking component, an initialization component that adaptively determines and reconstructs an initial set of keyframes that covers only a part of an image sequence (e.g., a set of spaced frames somewhere in the middle of the sequence), a keyframe reconstruction component that incrementally and adaptively determines and reconstructs additional keyframes to fully cover the image sequence, a self-calibration component that may be applied in the keyframe reconstruction component to produce a Euclidian (or metric) reconstruction in the uncalibrated case, an opt-keyframe reconstruction component that adaptively determines and reconstructs optimization keyframes to provide a better reconstruction, a non-keyframe reconstruction component that reconstructs any remaining frames in the image sequence, and a final processing component.

Figure 2:
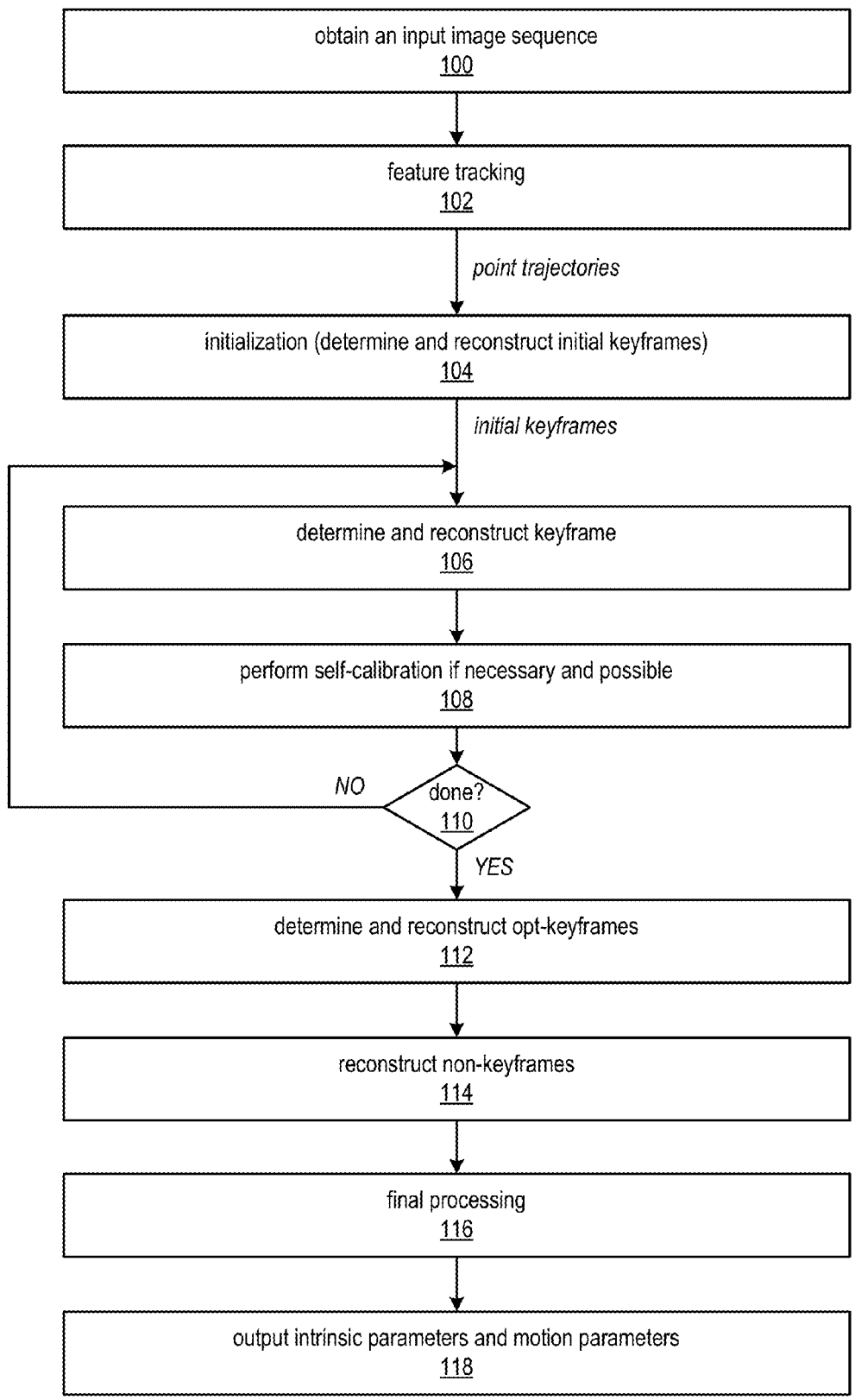
FIG. 2 is a high-level flowchart of a general 3D Structure from Motion (SFM) technique, according to at least some embodiments.

FIG. 2 is a high-level flowchart of the general SFM technique, according to at least some embodiments. Note that the general SFM technique as illustrated in FIG. 2 implements an embodiment of the adaptive reconstruction algorithm as illustrated in FIG. 1, with some additional elements added.

As indicated at 100, an input image sequence may be obtained. The image sequence may, for example, be a video taken by a moving video camera or a set of images taken with a still camera. As indicated at 102, a feature tracking technique may be applied to establish point trajectories over time in the input image sequence. Embodiments of a feature tracking technique that may be used in at least some embodiments are described later in this document. Output of the feature tracking technique is a set of point trajectories. As indicated at 104, an initialization technique may be performed to determine and reconstruct a set of initial keyframes covering a portion of the image sequence according to the point trajectories. Input to the initialization technique includes at least the set of point trajectories. Output of the initialization technique is a set of initial keyframes and the initial reconstruction.

Elements 106 through 110 are a keyframe reconstruction loop that incrementally and adaptively determines and reconstructs additional keyframes to fully cover the image sequence. As indicated at 106, a new keyframe is determined and reconstructed. In the calibrated case, a Euclidian reconstruction technique can be performed, since the camera intrinsic parameters are known. In the uncalibrated case, a projective reconstruction technique may be performed. As indicated at 108, in the uncalibrated case, a self-calibration technique may be applied to produce a Euclidian (or metric) reconstruction for the frame, if there are enough frames to perform the self-calibration. At 110, if there are more keyframes to be reconstructed, then the method returns to 106 to add a next keyframe. Otherwise, the method goes to element 112.

As indicated at 112, an opt-keyframe technique may then be performed to determine and reconstruct optimization keyframes to improve the quality of the reconstruction. As indicated at 114, non-keyframes (keyframes that have not yet been included in the reconstruction) may be reconstructed. As indicated at 116, final processing may be performed. As indicated at 118, at least the camera intrinsic parameters and the Euclidean motion parameters for the images in the input image sequence may be output.

The elements of the general SFM technique shown in FIG. 2 are discussed in more detail below.

Feature Tracking

As indicated at 102 of FIG. 2, given an input image sequence, embodiments of the general SFM technique may first perform feature tracking to establish point trajectories over time. A basic idea of feature tracking is to find the locations of the same point in subsequent video frames. In general, a point should be tracked as long and as accurately as possible, and as many points as possible should be tracked.

In at least some embodiments, the general SFM technique may use an implementation of the Lucas-Kanade-Tomasi algorithm to perform feature tracking. In these embodiments, for every point at time t, a translational model may be used to track against the previous video frame (at time t−1), and an affine model may be used to track against the reference video frame at time $t_0$ ($t_0$ may vary according to the point). The result of feature tracking is a set of point trajectories. Each point trajectory includes the two-dimensional (2D) locations of the "same" point in a contiguous set of frames. Let $x_{i,j}$ denote the 2D location of the i-th point in the j-th image. Since not all of the points are present in all of the images, $x_{i,j}$ is undefined for some combinations of i and j. To simplify the notation, a binary characteristic function, $\psi_{i,j}$:$\psi_{i,j}=1$, may be used if the i-th point is present on the j-th image; otherwise, $\psi_{i,j}=0$. Through $\psi_{i,j}$, quantities such as $\psi_{i,j}x_{i,j}$ may be used even if $x_{i,j}$ is undefined.

Note that various feature tracking algorithms and/or various matching paradigms, such as detecting and matching robust image features, may be used in various embodiments. The general SFM technique can work with any feature tracking technique that computes point trajectories.

In at least some embodiments, the point trajectories are input to the rest of the general SFM technique; the input image sequence may not be referenced after feature tracking.

Initialization Technique

As indicated at 20 of FIG. 1 and at 104 of FIG. 2, an initialization technique may be performed in an adaptive reconstruction algorithm to determine and reconstruct a set of initial keyframes covering a portion of the image sequence according to the point trajectories. As previously noted, at least some embodiments of the general SFM technique may implement an incremental approach that adds one or more frames to the reconstruction at a time. To accomplish this, an initial reconstruction may need to be generated. A goal of the initialization technique is to compute an initial reconstruction from a subset of frames in the image sequence. In at least some embodiments, two-view reconstruction algorithms may be used. Since the general SFM technique is incremental, the quality of the initial reconstruction may be important in generating a quality overall reconstruction. In at least some embodiments, to help achieve a quality initial reconstruction, two initial frames that best satisfy requirements of the initial reconstruction algorithm may be determined.

Figure 3:
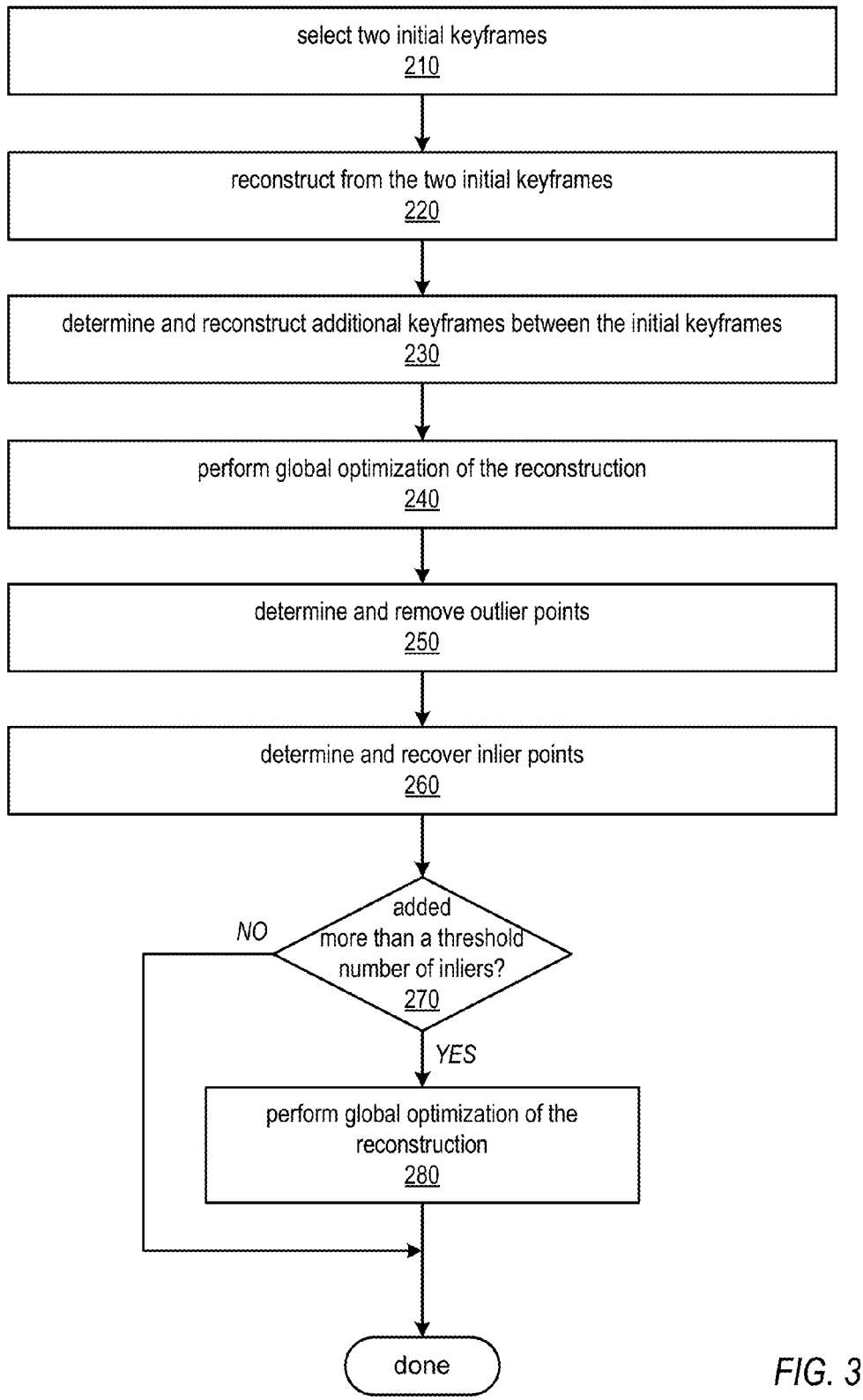
FIG. 3 is a flowchart of an initialization technique that may be used in a general adaptive reconstruction algorithm, for example as implemented by a general 3D SFM technique, according to at least some embodiments.

FIG. 3 is a flowchart of an initialization technique, according to at least some embodiments. Note that the initialization technique as illustrated in FIG. 3 may be used at 20 of FIG. 1 and at 104 of FIG. 2. Input to the initialization technique includes at least the set of point trajectories. As indicated at 210 of FIG. 3, two initial keyframes may be selected. As indicated at 220, a reconstruction may be performed from the two initial keyframes. As indicated at 230, additional keyframes between the initial keyframes may be determined and reconstructed. As indicated at 240, a global optimization of the reconstruction may be performed. As indicated at 250, one or more outlier points may be determined and removed. As indicated at 260, one or more inlier points may be determined and recovered. Note that outlier and inlier points correspond to particular point trajectories, and that the entire point trajectory is removed (for outlier points) or recovered (for inlier points). At 270, if more than a threshold number of inliers were recovered at 260, another global optimization may be performed as indicated at 280. Otherwise, the initialization technique is done. Output of the initialization technique is a set of initial keyframes and the initial reconstruction.

The elements of the initialization technique shown in FIG. 3 are discussed in more detail below.

Keyframe Selection

In at least some embodiments, the initialization technique may select a set of candidate frames from the image sequence in which the technique searches for the two best frames to use as initial frames. This set of candidate frames may be referred to as keyframes. In at least some embodiments, a keyframe selection algorithm may select a set of evenly spaced keyframes, for example one keyframe every half second or one keyframe every 15 frames, starting from the first frame of the image sequence. In at least some embodiments, video frame rate information, if available, may be used in determining which frames to select. For example, if the video frame rate is 30 frames per second, and the algorithm wants to sample at one frame every half-second, then the algorithm may select every $15^{th}$ frame as a keyframe. In at least some embodiments, if frame rate information is not available, the keyframe selection algorithm may assume the video is taken at 30 frames per second, or at some other rate. In at least some embodiments, if the last frame in the video sequence is not in the keyframe set, the frame is added as a keyframe. In at least some embodiments, output of the keyframe selection algorithm may be a set of evenly spaced keyframes, e.g. every $15^{th}$ frame from the image sequence, which includes the first and last frames in the image sequence. Note, however, that the next-to-last and last keyframe may be closer than other pairs of keyframes in the set, since the last keyframe may have been added in the last step.

Note that the keyframe selection algorithm described above is given as an example and is not intended to be limiting. Other techniques may be used to select a set of keyframes in some embodiments.

Candidate Initial Pairs

In at least some embodiments, the initialization technique may select a set of candidate initial pairs from the keyframes. In at least some embodiments, a candidate initial pairs selection algorithm may first select all the adjacent-2 keyframe pairs. An adjacent-k keyframe pair may be defined as a pair of keyframes that are k keyframes apart from each other. The algorithm may then densely sample a first subset of the image sequence that includes at least a portion of the keyframes. In at least some embodiments, the size of this subset may be computed as follows: if the total number of keyframes is less than 8, all the keyframes are included; if the total number of keyframes is less than 16, half of the keyframes may be included; otherwise, one third of the keyframes may be included.

In at least some embodiments, scores for all possible pairs of keyframes within the densely sampled subset may then be computed.

Score Computation

In at least some embodiments, for each candidate initial pair, two quantities: s and e may be computed as follows. All of the points that overlap the two frames in the candidate pair are collected. A tentative reconstruction is performed, for example using the algorithm described in the section titled Initial pair reconstruction. In at least some embodiments, s may be set to the number of inlier points. A homography may be computed that best fits all the overlapping points. A homography computation algorithm is described in the section titled Homography computation. In at least some embodiments, for each inlier point, a fitting residual is computed. In at least some embodiments, the residuals are sorted, and e is set to the residual value at a percentage (e.g., 80%) of the number of points.

Homography Computation

In at least some embodiments, given a set of points in two frames, a 4-point based RANSAC algorithm may be used to compute an initial homography along with a set of points that are consistent with the homography. These points may be referred to as inlier points. Points that are not consistent with a computed homography may be referred to as outlier points. The initial homography may be refined using the inlier points through nonlinear optimization. In at least some embodiments, the nonlinear optimization refines the following cost function:

$$\operatorname*{argmin}_{x_i, H} \sum_{i=1}^{N} \psi_{i,r_0} \psi_{i,r_1} (\|x_{i,r_0} - K_{r_0} x_i\|^2 + \|x_{i,r_1} - K_{r_1} H x_i\|^2) \quad (A1)$$

where $r_0$ and $r_1$ are the indices of the two frames and $K\,r_0$ and $K\,r_1$ are the associated camera intrinsic parameters. In at least some embodiments, in the calibrated case, $K\,r_0$ and $K\,r_1$ are the input values and in the uncalibrated case, a nominal value may be used for the focal length that is the half of the sum of the frame width and height.

Initial Pair Selection

At this point, a score has been computed for each candidate pair, and a best initial pair may be selected, for example as follows. In at least some embodiments, among all the candidate pairs, the pairs are found whose e scores are larger than a threshold $S_1$ (which may be computed based on video dimension). From these pairs, the pair with the largest number of point correspondences may be chosen. In the case of a tie in terms of the number of correspondences, a pair with the largest time span may be chosen from the tied pairs.

In at least some embodiments, if the previous step fails, e.g. if all the candidate pairs have e scores lower than the threshold $S_1$, the candidate pairs that are more than $S_2$ number of frames apart and whose numbers of point correspondences are larger than a threshold $S_3$ are found. From these pairs, the pair with the largest number of correspondences may be chosen.

In at least some embodiments, if the previous step fails, the candidate pairs may be sorted according to the product of s and e. The best pair may be compared to the second best pair, for example as follows. Let $s_1$ and $e_1$ be the quantities computed for the best pair and $s_2$ and $e_2$ be the quantities computed for the second best pair. If $s_2 e_2$ is larger than $S_5 s_1 e_1$ and the best pair is a subset of the second best pair in time, the second pair may be used. Otherwise, the best pair is used.

Note that the initial pair selection algorithm described above is given as an example and is not intended to be limiting. Other techniques may be used to select a pair of initial keyframes in some embodiments.

Initial Pair Reconstruction

An initial reconstruction may be computed from two given images. These two images may, for example, be the best initial pair selected in the section titled Initial pair selection, or a candidate pair considered in the section titled Score computation. Let $r_0$ and $r_1$ be the indices of the two images. All of the point trajectories that overlap both images are found. The algorithm is different according to the camera intrinsic parameters.

Initial Pair Reconstruction, Calibrated Case

In the calibrated case, the camera intrinsic parameters are known. Therefore, a Euclidean reconstruction can be performed. In at least some embodiments, a 5-point based RANSAC algorithm may be used to compute the initial relative rigid motion between the two images. The RANSAC algorithm returns the essential matrix from $r_0$ to $r_1$ along with a set of points that are consistent with the essential matrix. From the essential matrix, the overlapping points can be triangulated. Points whose reprojection errors are larger than a threshold may be discarded. The essential matrix may be decomposed into the relative rotation and translation. There are four solutions for the decomposition step. The solution that has the largest number of consistent points may be chosen.

In at least some embodiments, the reconstruction may be further refined with a nonlinear optimization. In at least some embodiments, the nonlinear optimization refines the following cost function:

$$\underset{X_i, R, T}{\arg\min} \sum_{i=1}^{N} \psi_{i, r_0} \psi_{i, r_1} (\|x_{i, r_0} - \pi(K_{r_0} X_i)\|^2 + \quad (A2)$$
$$\psi_{i,j} \|x_{i, r_1} - \pi(K_{r_1}(R X_i + T))\|^2)$$

In at least some embodiments, the nonlinear optimization problem may be solved according to a nonlinear optimization technique, for example as described in the section titled Bundle adjustment technique. The nonlinear optimization obtains a better estimate for the relative rotation R, translation T, and three-dimensional (3D) points $X_i$. However, this estimate only uses inlier points estimated the previous RANSAC step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

In at least some embodiments, the rotation and translation of the first camera ($r_0$) may then be set to the identity transformation $(I, [0, 0, 0]^T)$ and those of the second camera ($r_1$) to $(R, T)$. In at least some embodiments, $r_0$ and $r_1$ may be retained, as they may be used in later optimizations.

Initial Pair Reconstruction, Uncalibrated Case

In the uncalibrated case, the camera intrinsic parameters are not known. Although it may be possible to obtain a Euclidean reconstruction using the assumptions presented in the Introduction, in at least some embodiments, a projective reconstruction from the two images may be performed. The projective reconstruction may later be upgraded to a Euclidean reconstruction using a self-calibration technique, for example as described in the section titled Self-calibration.

In at least some embodiments, a 7-point based RANSAC algorithm may be used to compute the fundamental matrix between frames $r_0$ and $r_1$. The algorithm gives the best fundamental matrix along with a set of inlier points that are consistent with the fundamental matrix. The inlier points may be used to compute a new fundamental matrix using a linear algorithm. The fundamental matrix may then be converted into a pair of 3×4 projection matrices using a canonical decomposition technique. Using the two projection matrices, the inlier points can be triangulated, for example using an optimal triangulation algorithm.

In at least some embodiments, the two projection matrices and 3D points may be refined using a nonlinear optimization. In at least some embodiments, the nonlinear optimization refines the following cost function:

$$\underset{X_i, P}{\arg\min} \sum_{i=1}^{N} \psi_{i, r_0} \psi_{i, r_1} (\|x_{i, r_0} - \pi(K_{r_0} X_i)\|^2 + \quad (A3)$$
$$\psi_{i,j} \|x_{i, r_1} - \pi(K_{r_1}(P^L X_i + P^R))\|^2)$$

where $P^L$ and $P^R$ are the left 3×3 and right 3×1 parts of P respectively. In at least some embodiments, the nonlinear optimization problem may be solved according to a nonlinear optimization technique, for example as described in the section titled Bundle adjustment technique. The nonlinear optimization may obtain a better estimate for the projection matrices and the 3D points. Similar to the calibrated case, the nonlinear optimization only uses inlier points estimated in the previous RANSAC/linear step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

In at least some embodiments, the rotation and translation of the first camera ($r_0$) may then be set to the identity transformation $(I, [0, 0, 0]^T)$ and those of the second camera ($r_1$) to P. In at least some embodiments, $r_0$ and $r_1$ may be retained, as they may be used in later optimizations.

In at least some embodiments, all of the points that overlap the two initial frames but that are not found to be inlier points may be collected into a set referred to as outlier points. This may be done in both the calibrated and uncalibrated cases.

Reconstruction Between the Initial Pair

In at least some embodiments, the initial reconstruction may be enlarged by incorporating one or more frames between the initial pair. In at least some embodiments, for efficiency, only the keyframes that were selected in the section titled Keyframe selection and that lie between the two frames in the initial pair are considered. For each keyframe in ($r_0$, $r_1$), the proper motion representation may be computed. This computation may be performed differently depending on whether the input sequence is calibrated or uncalibrated.

Reconstruction Between the Initial Pair, Calibrated Case

In the calibrated case, a Euclidean reconstruction has already been computed, and the camera intrinsic parameters are known for each frame. Therefore, only the rotation and translation needs to be computed. In at least some embodiments, this may be performed as follows.

Let $X_i \in \square^3$, $i=1, 2, \ldots, N$ be the inlier points in the initial reconstruction. Let r be the index of the keyframe of interest. In at least some embodiments, a 3-point based RANSAC algorithm may be used to compute the rotation and translation along with a set of inlier points. The estimates ($R_r$, $T_r$) may then be refined via nonlinear optimization, using all the points:

$$\arg\min_{X_i, R_r, T_r} \sum_{i=1}^{N} \psi_{i,r} \|x_{i,r} - \pi(K_{r_0}(R_r X_i + T_r))\|^2 \quad (A4)$$

Reconstruction Between the Initial Pair, Uncalibrated Case

In the uncalibrated case, a projective reconstruction was computed. As a result, a 3×4 projection matrix needs to be computed for each keyframe.

Let $X_i \in \square^3$, $i=1, 2, \ldots, N$ be the inlier points in the initial reconstruction. Let r be the index of the keyframe of interest. In at least some embodiments, a 6-point based RANSAC algorithm may be used to compute an initial projection matrix. The estimates may then be refined via nonlinear optimization with a robust cost function, using all the points:

$$\arg\min_{X_i, P_r} \sum_{i=1}^{N} \psi_{i,r} \rho(x_{i,r} - \pi(K_{r_0}(P_r^L X_i + P_r^R))) \quad (A5)$$

where $\rho(\cdot)$ is a robust function. In at least some embodiments, the Huber function may be used as the robust function.

Initialization Refinement

At this point, a set of keyframes in the reconstruction, along with a set of points that are consistent with the motion parameters (both calibrated and uncalibrated), have been computed. However, the motion parameters and the points have not been optimized. In initialization refinement, the motion parameters and the points may be optimized together to obtain a better reconstruction. In at least some embodiments, a multi-view bundle adjustment may be performed with all the cameras and all the points (see details in the section titled Optimization using multi-view bundle adjustment). After the bundle adjustment, points whose reprojection errors are too large may be removed (see details in the section titled Outlier removal); these points are moved from the inlier set to the outlier set. The points in the outlier set may then be examined to find points that are consistent with the motion parameters (see details in the section titled Inlier recovery); these points are moved from the outlier set to the inlier set. In at least some embodiments, if the number of newly added inliers exceeds a threshold, for example computed as a ratio of the number of original points, an additional multi-view bundle adjustment may be performed (see details in the section titled Optimization using multi-view bundle adjustment).

Optimization Using Multi-View Bundle Adjustment

In at least some embodiments, at various points within the general SFM technique, the parameters of a current reconstruction may be optimized. An optimization technique that may be used in at least some embodiments is described in the section titled Bundle adjustment technique. In at least some embodiments, there are four different multi-view bundle adjustment cases for the general SFM technique: projective, calibrated, uncalibrated (constant focal length) and uncalibrated (varying focal length). An example cost function that may be used in the bundle adjustment technique for each of these cases is described below.

Multi-View Bundle Adjustment Cost Functions

This section describes the cost function for each bundle adjustment case of the general SFM technique. In all the cases, points may be represented as a vector in $\square^3$. However, the cameras are represented differently in each case. At least some embodiments may assume that there are M cameras in the current reconstruction. To simplify the notation, the camera indices may be assumed to be 1 to M.

In the projective case, each camera is represented as a 3×4 projection matrix. In at least some embodiments, the following cost function may be optimized:

$$\arg\min_{X_i, P_j} \sum_{i=1}^{N} \sum_{j=1}^{M} \psi_{i,j} \|x_{i,j} - \pi(K_j(P_j^L X_i + P_j^R))\|^2 \quad (A6)$$

where $P_j \in \square^{3,4}$ is the 3×4 projection matrix for the j-image and $P_j^L$ and $P_j^R$ are the left 3×3 part and the right 3×1 part of $P_j$, respectively. $K_j$ is the nominal intrinsic parameters of the j-th camera. In at least some embodiments, in order to fix the projective ambiguity, the (reference—0) camera may be fixed to the identity projection matrix:

$$\begin{bmatrix} 1 & 0 & 0 & 0 \\ 0 & 1 & 0 & 0 \\ 0 & 0 & 1 & 0 \end{bmatrix} \quad (A7)$$

In at least some embodiments, the right 3×1 part of the projection matrix of the (reference—1) camera may be fixed to have a unit norm.

In the calibrated and uncalibrated cases, each camera may be represented as a 3×3 rotation matrix, a 3×1 translation vector and an intrinsic matrix. In at least some embodiments, the following cost function may be optimized in the case of calibrated cameras:

$$\arg\min_{X_i, R_j, T_j} \sum_{i=1}^{N} \sum_{j=1}^{M} \psi_{i,j} \|x_{i,j} - \pi(K_j(R_j X_i + T_j))\|^2 \quad (A8)$$

In at least some embodiments, the following cost function may be optimized in the case of uncalibrated cameras with a constant focal length:

$$\arg\min_{X_i,f,R_j,T_j} \sum_{i=1}^{N} \sum_{j=1}^{M} \psi_{i,j} \|x_{i,j} - \pi(K_j(f)(R_jX_i + T_j))\|^2 \quad (A9)$$

In at least some embodiments, the following cost function may be optimized in the case of uncalibrated cameras with varying focal lengths:

$$\arg\min_{X_i,f_j,R_j,T_j} \sum_{i=1}^{N} \sum_{j=1}^{M} \psi_{i,j} \|x_{i,j} - \pi(K_j(f_j)(R_jX_i + T_j))\|^2 \quad (A10)$$

In at least some embodiments, in order to fix the ambiguity, the (reference—0) camera may be fixed to the identity rotation matrix and a zero translation vector. In at least some embodiments, the translation vector of the (reference—1) camera may be fixed to a unit normal.

Optimization

In at least some embodiments, a bundle adjustment technique that may detect and remove poorly conditioned points during bundle adjustment, for example as described in the section titled Bundle adjustment technique, may be used in all the cases. In at least some embodiments, the detected poorly conditioned points may be removed from the reconstruction and placed in the outlier set.

Outlier Removal

In at least some embodiments, a current reconstruction may be improved by removing points that have relatively large reprojection errors in one or more cameras. These points may be referred to as outlier points. In at least some embodiments, for each point in the inlier set, all the cameras on which this point is visible are found, and the reprojection error at each of these cameras is computed. In the projective case, the reprojection error may be defined as $$\|x_{i,j} - \pi(K_j(P_j^L X_i + P_j^R))\|^2 \quad (A11)$$

In the calibrated and uncalibrated cases, the reprojection error may be defined as:

$$\|x_{i,j} - \pi(K_j(R_j X_i + T_j))\|^2 \quad (A12)$$

All the points whose reprojection error is larger than a threshold on any camera may be collected. These points are removed from the inlier set and placed into to the outlier set.

Inlier Recovery

In at least some embodiments, good points may be recovered from the outlier set of a current reconstruction. In at least some embodiments, for each point in the outlier set, all the cameras on which this point is visible are found, and the optimal coordinates are computed, assuming the cameras are fixed. In at least some embodiments, the optimal coordinates may be computed by optimizing the accumulative reprojection error in all the visible cameras. In at least some embodiments, in the projective case, the following cost function may be optimized:

$$\arg\min_{X_i} \sum_{j=1}^{M} \psi_{i,j} \|x_{i,j} - \pi(K_j(P_j^L X_i + P_j^R))\|^2 \quad (A13)$$

In at least some embodiments, in the calibrated and uncalibrated cases, the following cost function may be optimized:

$$\arg\min_{X_i} \sum_{j=1}^{M} \psi_{i,j} \|x_{i,j} - \pi(K_j(R_j X_i + T_j))\|^2 \quad (A14)$$

In at least some embodiments, after the optimal coordinates are obtained, the reprojection error for each camera may again be computed. If all the errors are below a threshold, the following matrix may be computed:

$$\sum_{j=1}^{M} \psi_{i,j} J_j J_j^T \quad (A15)$$

where $J_j$ is the Jacobian matrix of the j-th reprojection error with respect to a point. In at least some embodiments, the rank of the matrix may be checked. If the point passes the test, the point is moved from the outlier set to the inlier set.

Keyframe Reconstruction Loop

As indicated at 30 of FIG. 1 and at 106-110 of FIG. 2, additional keyframes may be determined and reconstructed to cover the image sequence. In at least some embodiments of the general SFM technique, a keyframe reconstruction loop may be used to enlarge the initial reconstruction to cover the entire image sequence. The keyframe reconstruction loop may add keyframes in an incremental and adaptive fashion, adding one keyframe at a time until the entire video sequence is covered. Note that this loop does not add all the frames in the input image sequence. Instead, an adaptive algorithm is used to select particular frame to add. In at least some embodiments, the additional keyframes may be selected from the set of keyframes that were previously selected (see the section titled Keyframe Selection). In at least some embodiments, the initial reconstruction may cover a portion of the image sequence, and the additional keyframes may be added one at a time at each end of the current reconstruction, working outwards and alternating between ends.

Figure 4:
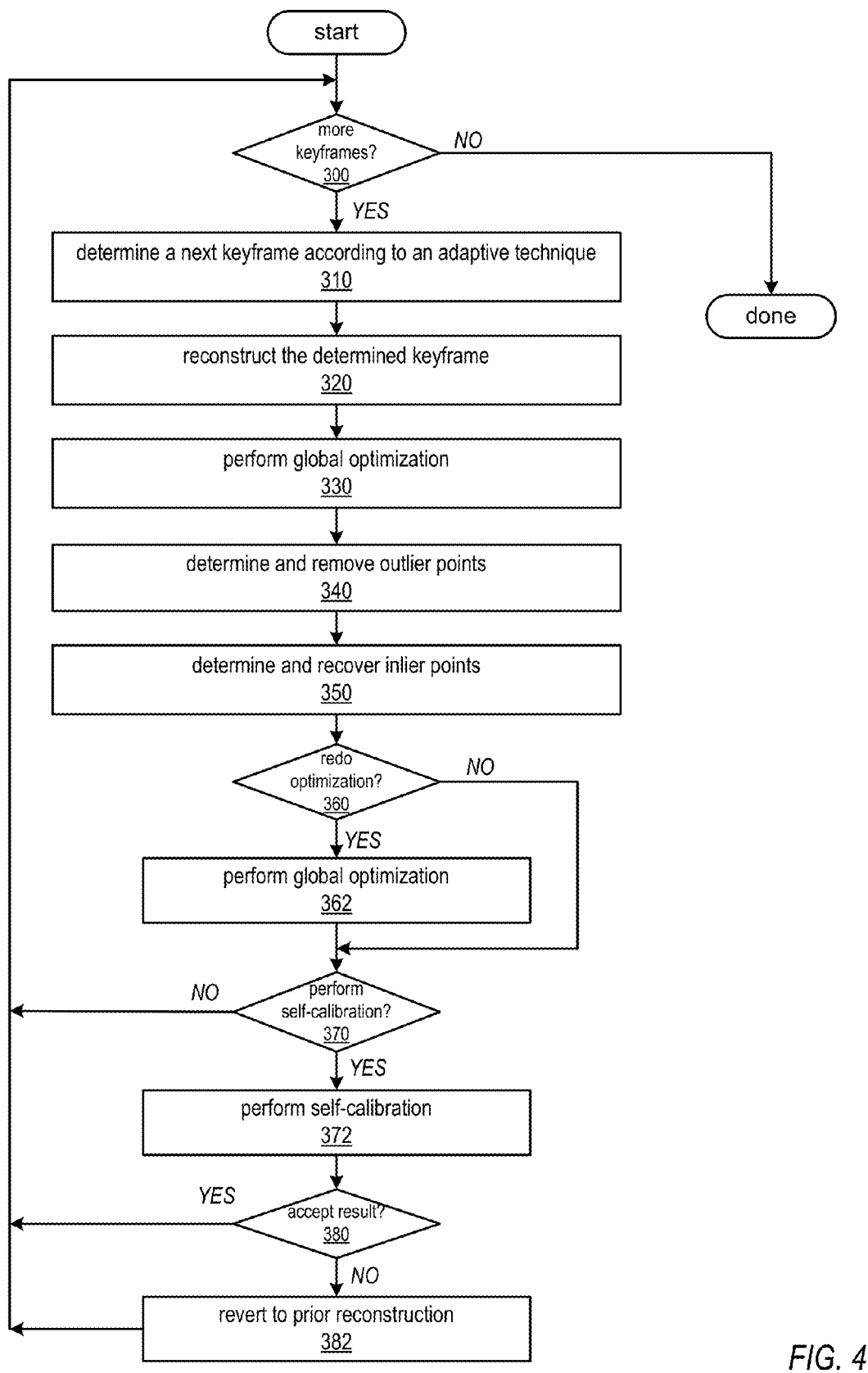
FIG. 4 is a flowchart of an adaptive technique for iteratively selecting and reconstructing additional keyframes to fully cover the image sequence that may be used in a general adaptive reconstruction algorithm, for example as implemented by a general 3D SFM technique, according to at least some embodiments.

FIG. 4 is a flowchart of an adaptive technique for iteratively selecting and reconstructing additional keyframes to fully cover the image sequence that may be used in a general adaptive reconstruction algorithm, for example as implemented by a general 3D SFM technique, according to at least some embodiments.

At 300, if all keyframes have been processed, then the adaptive technique for iteratively selecting and reconstructing additional keyframes is done. Otherwise, the technique proceeds to element 310. As indicated at 310, a next keyframe may be determined according to an adaptive selection technique. As indicated at 320, the determined keyframe may be reconstructed and thus added to the current reconstruction. As indicated at 330, a global optimization may be performed on the current reconstruction. As indicated at 340, one or more outlier points may be determined and removed from the reconstruction. As indicated at 350, one or more inlier points may be determined and recovered (added to the reconstruction). At 360, if the number of inlier points that were added exceed a threshold, then a global optimization may again be performed on the current reconstruction as indicated at 362. At 370, in the calibrated case, the current reconstruction is already a Euclidian reconstruction, so the technique returns to element 300 to determine if there are more keyframes to be processed. Otherwise, this is the uncalibrated case, and the reconstruction is a projective construction. If there are enough frames to perform self-calibration at this point, then self-calibration may be performed as indicated at 372 to upgrade the projective reconstruction to a Euclidean reconstruction. Results of the self-calibration may be analyzed to determine if the results are acceptable. At 380, if the results of the self-calibration are accepted, the technique returns to element 300 to determine if there are more keyframes to be processed. Otherwise, the technique reverts to the reconstruction prior to the self-calibration attempt as indicated at 382, and the technique returns to element 300 to determine if there are more keyframes to be processed.

The elements of the technique shown in FIG. 4 are discussed in more detail below.

Adaptive Keyframe Selection

Figure 5:
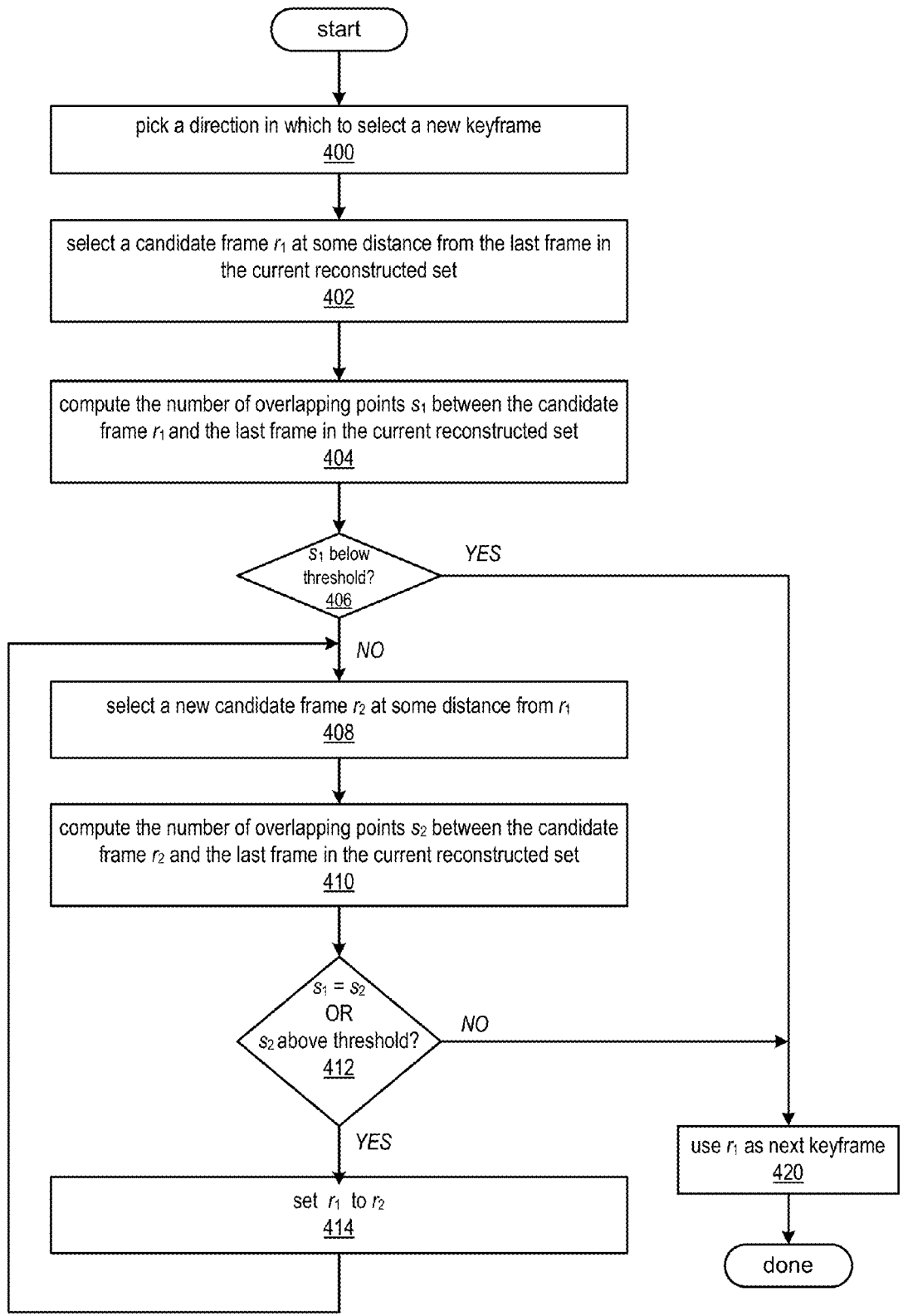
FIG. 5 is a flowchart of a method for selecting a next keyframe, according to at least some embodiments.

In at least some embodiments, a next keyframe may be selected in either of two directions: before and after the current reconstructed set of keyframes. At least some embodiments may alternate between the two directions. Without loss of generality, a method for selecting the next keyframe after the current reconstructed set is described; a method for selecting the next keyframe before the current reconstructed set would be similar. FIG. 5 is a flowchart of a method for selecting a next keyframe, according to at least some embodiments. "Before" and "after" in this context may refer to temporally before and temporally after the current reconstructed set.

As indicated at 400, a direction is picked in which to select a new keyframe. In at least some embodiments, the method may start in either direction, and may then alternate between the before and after directions. Without loss of generality, the following assumes the direction picked is after the current reconstructed set.

As indicated at 402, a candidate frame is selected that is some temporal distance (e.g., a half second) or some distance in frames (e.g., 15 frames) after the last frame in the current reconstructed set. Let the index of this frame be $r_1$. If $r_1$ is beyond the end of the image sequence, $r_1$ may be set to the last frame in the sequence if not already computed. In at least some embodiments, if the last frame is already computed, the method may quit, or alternatively may continue to process frames in the other direction until done.

As indicated at 404, the number of overlapping points between the candidate frame $r_1$ and the last frame in the current reconstructed set is computed. Let this number be $s_1$. At 406, if $s_1$ is below a threshold, the search is stopped and $r_1$ is used as the next keyframe, as indicated at 420.

If $r_1$ is not selected at 406, then as indicated at 408, a new candidate frame is computed that is some temporal distance (e.g., a half second) or some distance in frames (e.g., 15 frames) out from $r_1$. Let the index of the new candidate frame be $r_2$. As indicated at 410, the number of overlapping points between the new candidate frame and the last frame in the reconstructed set is computed. Let the number be $s_2$.

At 412, if $s_1 = s_2$ or if $s_2$ is above a threshold, $r_1$ is set to $r_2$ and the process is repeated beginning at element 408. Otherwise, the search is stopped and $r_1$ is used as the next keyframe, as indicated at 420.

Figure 6:
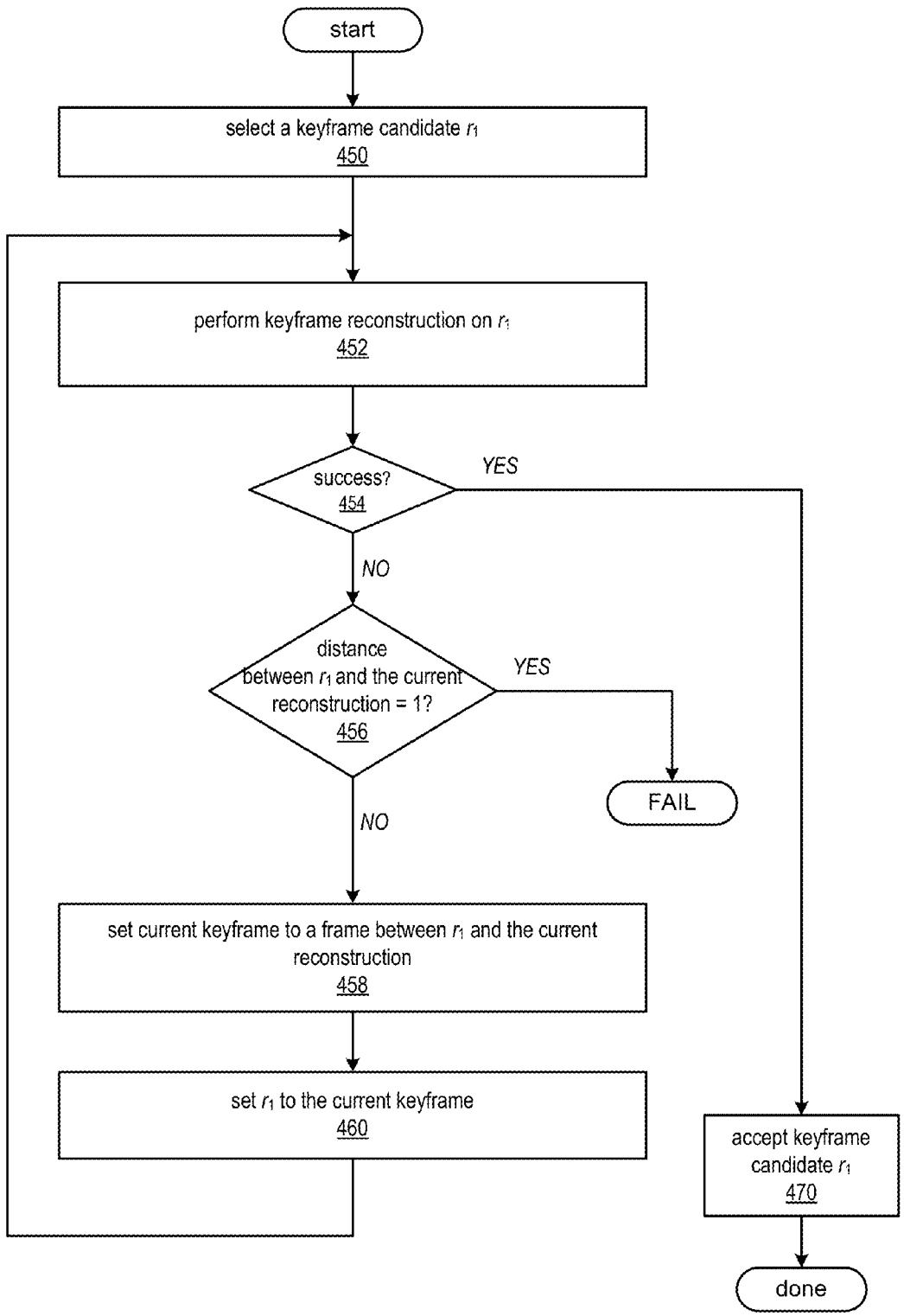
FIG. 6 is a flowchart of a method to decrease the distance between the current reconstructed set and the next keyframe that may be used in at least some embodiments.

The above method may increase the distance between the current reconstructed set and the next keyframe, but does not decrease the distance. However, it may be useful to be able to decrease the distance because the method may go out too far and there may not be enough overlapping points to support the keyframe computation (details are given in the section titled Keyframe reconstruction). Therefore, in at least some embodiments, a technique may be performed to decrease the distance between the current reconstructed set and the next keyframe, if necessary. FIG. 6 is a flowchart of a method to decrease the distance between the current reconstructed set and the next keyframe that may be used in at least some embodiments.

As indicated at 450, a keyframe candidate may be selected. In at least some embodiments, the method as illustrated in FIG. 5 may be used to select the keyframe candidate. Let $r_1$ be the index of the selected keyframe candidate.

As indicated at 452, keyframe reconstruction may be performed on $r_1$. In at least some embodiments, an algorithm as described in the section titled Keyframe reconstruction may be performed on keyframe candidate $r_1$ to perform the keyframe reconstruction.

At 454, if the keyframe reconstruction is successful, the method is done, and keyframe candidate $r_1$ is accepted, as indicated at 470. Otherwise, at 456, if the distance between $r_1$ and the current reconstruction is 1, the method quits and failure is declared. Otherwise, if the distance between $r_1$ and the current reconstruction is greater than 1 at 456, the current keyframe is set to a frame between $r_1$ and the current reconstruction (e.g., the middle frame) as indicated at 458, $r_1$ is set to the current keyframe as indicated at 460, and the method returns to 452 with the current frame as $r_1$.

Keyframe Reconstruction

This section describes methods for computing a new keyframe, for example a frame as selected in the previous section (Adaptive keyframe selection), according to some embodiments. In at least some embodiments, there may be different methods for keyframe reconstruction that depend on whether the current reconstruction is Euclidean or projective, and whether the focal length is constant or variable. These methods may be referred to as the calibrated algorithm or method and the projective algorithm or method. In at least some embodiments, the calibrated algorithm may be applied to either a calibrated sequence, or to an uncalibrated sequence where self-calibration has taken place and the focal length is constant over the entire sequence. In at least some embodiments, the projective algorithm may be applied to either an uncalibrated sequence where self-calibration either has not taken place or has failed or to an uncalibrated sequence with a varying focal length.

Keyframe Reconstruction, Calibrated Case

In at least some embodiments, a calibrated algorithm may be applied to either a calibrated sequence or to an uncalibrated sequence where self-calibration has taken place and the focal length is constant over the entire sequence. In this case, either the correct focal length or a good estimate for the focal length (because it is constant and there are estimates from other frames) is available. In at least some embodiments, to make the calibrated algorithm more robust, the focal length may be fixed, and only the rotation and translation may be estimated (the reconstruction is already Euclidean).

Le the index of the new keyframe be s. All the points from the inlier set of the current reconstruction that are visible in the new keyframe s are found. In at least some embodiments, a 3-point based RANSAC algorithm may be used to compute an initial rotation and translation. The initial rotation and translation may be refined with a nonlinear optimization technique. In at least some embodiments, the nonlinear optimization refines the following cost function:

$$\arg\min_{R_S, T_S} \sum_{i=1}^{N} \psi_{i,s} \| x_{i,j} - \pi(K_s(R_s X_i + T_s)) \|^2 \qquad (A16)$$

The nonlinear optimization may provide a better estimate for the rotation and translation. A next step is to add new points. In at least some embodiments, the closest frame to s from the current reconstruction may be found. Let the index of this frame be t. All of the points that overlap both frames s and t but are not in either the inlier set or the outlier set of the current reconstruction may be found. For each point, its 3D coordinates may be triangulated using the newly estimated motion parameters for keyframe s and the motion parameters for keyframe t from the current reconstruction. Successfully triangulated points are added to the inlier set; any points that cannot be triangulated are added to the outlier set.

Keyframe Reconstruction, Projective Case

In the projective case, the reconstruction can be either projective or Euclidean without a reasonable estimate for the focal length of the new keyframe. Therefore, the projection matrix of the new keyframe may be estimated. The algorithm is similar to the calibrated case.

Let the index of the new keyframe be s. All the points from the inlier set of the current reconstruction that are visible in the new keyframe s are found. In at least some embodiments, a 6-point based RANSAC algorithm may be used to compute an initial rotation and translation. The initial rotation and translation may be refined with a nonlinear optimization technique. In at least some embodiments, the nonlinear optimization refines the following cost function:

$$\arg\min_{P_s} \sum_{i=1}^{N} \psi_{i,s} \rho(x_{i,j} - \pi(K_s(P_s^L X_i + P_s^R)))^2 \qquad (A17)$$

where $K_s$ is the nominal intrinsic parameters of frame s and $\rho(\cdot)$ is a robust function. In at least some embodiments, the Huber function is used as the robust function. The nonlinear optimization may provide a better estimate for the projection matrix. A next step is to add new points. In at least some embodiments, the closest frame to s from the current reconstruction may be found. Let the index of this frame be t. All of the points that overlap both frames s and t but are not in either the inlier set or the outlier set of the current reconstruction may be found. For each point, its 3D coordinates may be triangulated using the newly estimated projection matrix for keyframe s and the projection matrix for keyframe t from the current reconstruction. Successfully triangulated points are added to the inlier set; any points that cannot be triangulated are added to the outlier set.

In at least some embodiments, in the case when the reconstruction is projective, the estimated projection matrix is taken. However, in the case when the reconstruction is Euclidean, the projection matrix $P_s$ may be decomposed into an intrinsic matrix $K'_s$, a rotation matrix and a translation vector as follows:

$$P_s = \lambda_s K'_s [R_s, T_s] \qquad (A18)$$

At least some embodiments may use $R_s$ and $T_s$, for the rotation and translation of the new keyframe. In at least some embodiments, $K=K_s K'_s$ is computed, and the focal length is set to be:

$$f_s = \frac{1}{2}(K(1, 1) + K(2, 2)).$$

Keyframe Reconstruction, Refinement

In at least some embodiments, the newly reconstructed keyframe and the newly added points may be optimized together with the existing frames and points (global optimization). A goal is to obtain better estimates for all of the parameters jointly. In at least some embodiments, a multi-view bundle adjustment is performed with all the cameras and all the points (see details in the section titled Optimization using multi-view bundle adjustment). After the bundle adjustment, points whose reprojection errors are too large may be removed (see details in the section titled Outlier removal); these points may be moved from the inlier set to the outlier set. All of the points in the outlier set may then be searched to find points that are consistent with the motion parameters (see details in the section titled Inlier recovery); these points may be moved from the outlier set to the inlier set. If the number of newly added inliers exceeds a threshold, which may be computed as a ratio of the number of the original points, an additional multi-view bundle adjustment may be performed.

Self-calibration

In at least some embodiments, a self-calibration technique may be applied to upgrade a reconstruction from projective to Euclidean (metric). Note that self-calibration may not be applied to the calibrated case because the reconstruction is already metric. Once the reconstruction is Euclidean, self-calibration does not need to be performed. In at least some embodiments, self-calibration is only performed when the number of cameras in the current reconstruction reaches a certain threshold. The section titled Nonlinear Self-Calibration Technique describes a self-calibration technique that may be used in at least some embodiments. This section describes a few extra steps that may be taken to ensure that the results of the self-calibration technique are good and thus accepted.

Figure 7:
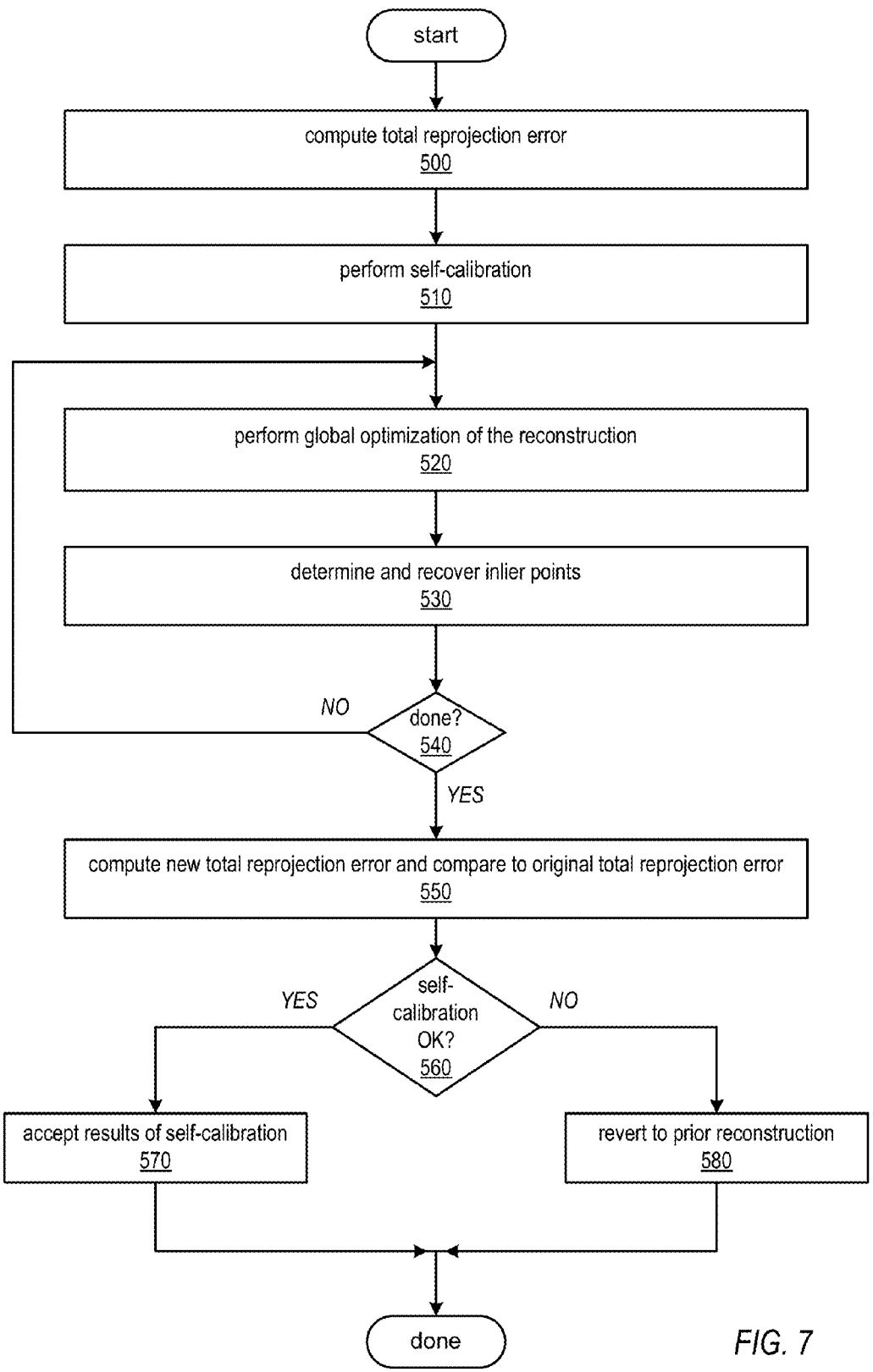
FIG. 7 is a flowchart of a self-calibration technique that may be applied in the adaptive technique for iteratively selecting and reconstructing additional keyframes, according to at least some embodiments.

FIG. 7 is a flowchart of a self-calibration technique that may be applied in the adaptive technique for iteratively selecting and reconstructing additional keyframes, according to at least some embodiments. In at least some embodiments, before self-calibration, a total reprojection error is computed, as indicated at 500. Self-calibration is then performed, as indicated at 510. In at least some embodiments, a self-calibration technique as described in the section titled Nonlinear Self-Calibration Technique may be used. After self-calibration, a global optimization of the reconstruction may be performed, as indicated at 520. In at least some embodiments, a multi-view bundle adjustment technique as described in the section titled Optimization using multi-view bundle adjustment may be used. As indicated at 530, inlier points may be determined and recovered, for example as described in the section titled Inlier recovery. As indicated by 540, in at least some embodiments, the method may iterate between adding inliers and global optimization (e.g., multi-view bundle adjustment) until either no new inlier is added or the iteration count reaches a pre-defined threshold. At 540, when done, a new total reprojection error may be computed and compared to the total reprojection error that was previously computed at 500, as indicated at 550. At 560, the results of the comparison may be used to determine if the self-calibration was successful. In at least some embodiments, if the new total reprojection error is no more than a pre-defined factor of the total reprojection error computed before self-calibration, the self-calibration result is accepted as indicated at 570. Otherwise, the self-calibration step has failed, and the reconstruction is reverted back to the state before self-calibration, as indicated at 580.

Opt-keyframe Reconstruction

As indicated at 40 of FIG. 1 and at 112 of FIG. 2, an opt-keyframe technique may be applied to a reconstruction for an image sequence to determine and reconstruct optimization keyframes to improve the quality of the reconstruction.

In the opt-keyframe technique, additional frames, referred to herein as "opt-keyframes", are determined and added to the reconstruction, and the reconstruction is again globally optimized. By adding more optimized frames and more optimized points, the quality of the reconstruction may be improved.

Figure 8:
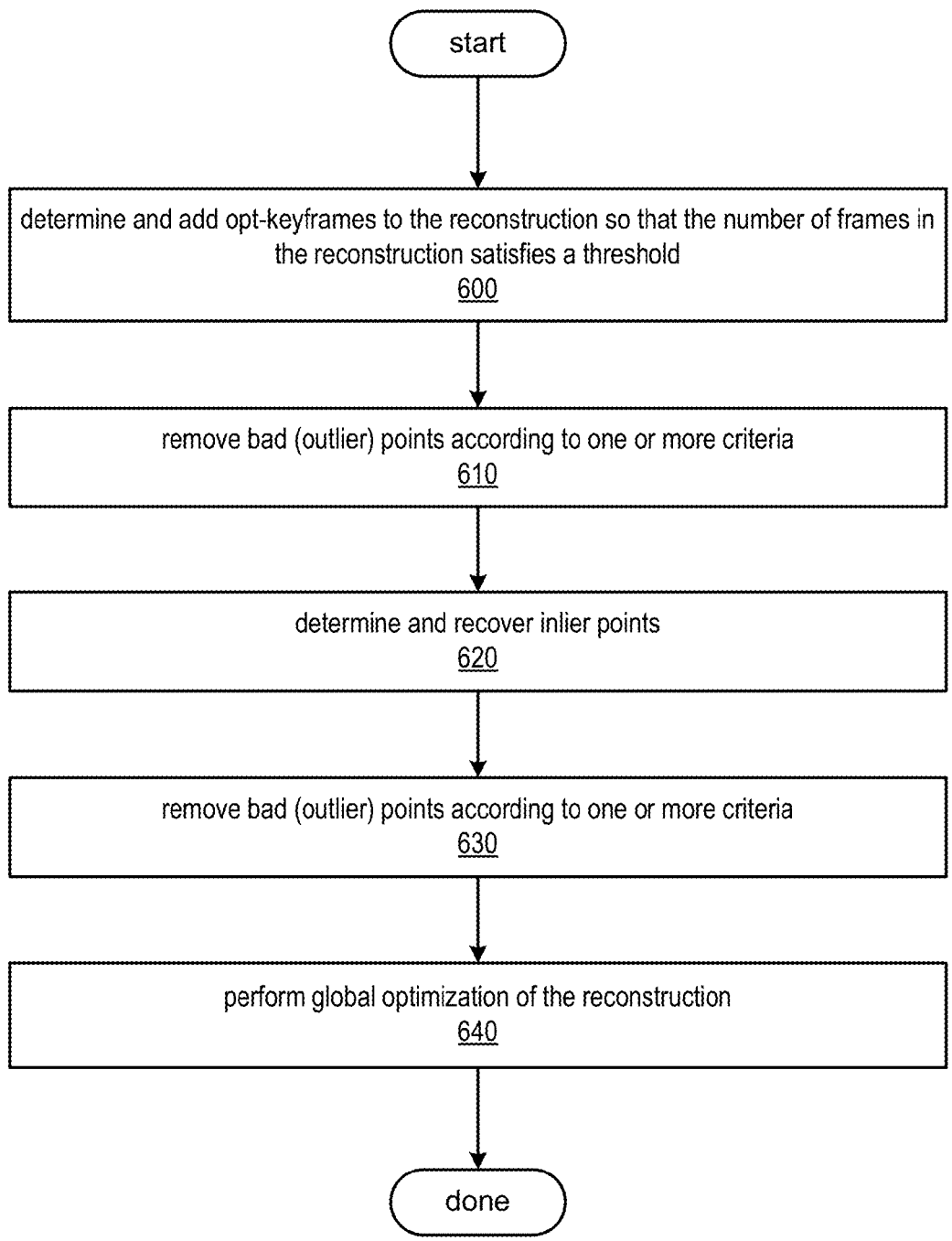
FIG. 8 is a flowchart of a technique for selecting and reconstructing optimizing keyframes (which may be referred to as opt-keyframes) that may be used in a general adaptive reconstruction algorithm, for example as implemented by a general 3D SFM technique, to provide a better reconstruction, according to at least some embodiments.

FIG. 8 is a flowchart of a technique for selecting and reconstructing optimizing keyframes (which may be referred to as opt-keyframes) that may be used in a general adaptive reconstruction algorithm, for example as implemented by a general 3D SFM technique, to provide a better reconstruction, according to at least some embodiments. As indicated at 600, opt-keyframes may be determined and added to the reconstruction so that the total number of frames in the reconstruction satisfies a threshold. As indicated at 610, one or more bad (outlier) points may be determined according to one or more criteria and removed from the reconstruction. As indicated at 620, one or more good (inlier) points may be determined and recovered. As indicated at 630, bad (outlier) points may again be determined according to one or more criteria and removed from the reconstruction. As indicated at 640, the reconstruction may then be globally optimized.

The elements of the technique shown in FIG. 8 are discussed in more detail below.

In at least some embodiments, given the current reconstruction, a set of opt-keyframes may be computed that are uniformly spread in the entire sequence so that the total number of frames reaches a pre-defined threshold. The camera parameters for the newly selected opt-keyframes may be computed, for example using a method described in the section titled Non-keyframe reconstruction.

Opt-keyframe Reconstruction Refinement

After the opt-keyframes are determined and added to the reconstruction, the current reconstruction may be refined (elements 610 through 640 of FIG. 8). In at least some embodiments, obviously bad points may be removed from the reconstruction as follows. Points that are either too close to the cameras or behind the cameras may be removed. Next, the median depth of all the points is computed, and points whose depths are more than a factor of the median depth may be removed. Finally, points whose reprojection errors are larger than a threshold may be removed.

After the points in the reconstruction are cleaned by removing bad points as described above, the median distance between all the adjacent pairs of cameras in the current reconstruction may be computed. All of the point trajectories that are not in the inlier set or the outlier set are searched. For each of these point trajectories, all the cameras where this point is visible are found. The maximum distance between these cameras is computed and compared against a threshold that is computed based on the median camera distance. If the maximum distance is larger than the median distance, the point is reconstructed using an algorithm similar to the one described in the section titled Inlier recovery.

In at least some embodiments, these reconstructed points are not added directly to the reconstruction. Instead, after all the new points are considered, bad points are again removed using the median thresholding technique described above, and the remaining points are added to the reconstruction.

In at least some embodiments, after removing bad points and recovering good points, a global optimization of the reconstruction may be performed, for example according to the multi-view bundle adjustment technique described in the section titled Optimization using multi-view bundle adjustment, to further refine the parameters.

Adding the opt-keyframes and inlier points may result in additional, and possibly shorter, point trajectories being included in the reconstruction, thus providing a better reconstruction that may be more suited for later operations that may be applied to the image sequence, such as plane fitting.

Non-keyframe Reconstruction

As indicated at 50 of FIG. 1 and at 114 of FIG. 2, non-keyframes (keyframes that have not yet been included in the reconstruction) may be reconstructed. In at least some embodiments of a non-keyframe reconstruction technique, all of the frames in the input sequence that are not included in the current reconstruction may be reconstructed. These frames may be referred to as non-keyframes. In at least some embodiments, all the frames in the reconstruction that include both keyframes and opt-keyframes are first reconstructed. In at least some embodiments, the non-keyframe reconstruction technique may work on adjacent pairs of keyframes until all the pairs of keyframes have been processed. In at least some embodiments, for each pair, all of the 3D points that are visible in both frames are collected. These points may then be used to compute the parameters for a camera between the two frames, for example as described below.

Let r be the camera of interest. In at least some embodiments, the non-keyframe reconstruction technique may first interpolate the motion parameters along with the intrinsic parameters. In at least some embodiments, K, R, and T may be further optimized by optimizing a cost function. In at least some embodiments, in the calibrated case and the uncalibrated case with a constant focal length, the cost function may be:

$$\arg\min_{R_r,T_r} \sum_{i=1}^{N} \psi_{i,r} \|x_{i,j} - \pi(K_r(R_r X_i + T_r))\|^2 \quad (A19)$$

In at least some embodiments, in the uncalibrated case with a varying focal length, the cost function may be:

$$\arg\min_{f_r,R_r,T_r} \sum_{i=1}^{N} \psi_{i,r} \|x_{i,j} - \pi(K_r(f_r)(R_r X_i + T_r))\|^2 \quad (A20)$$

In at least some embodiments, each frame between a pair of keyframes is computed independently of the other frames, and each pair of keyframes is processed independently of the other pairs of keyframes.

Final Processing

As indicated at 60 of FIG. 1 and at 116 of FIG. 2, final processing may be performed. In at least some embodiments, there may be two steps in the final processing.

In at least some embodiments, the largest contiguous subset of frames in the reconstruction may be found. All the frames that are not in this subset, along with all the points that are not visible in any of the frames in the subset, may be removed from the reconstruction.

In at least some embodiments, optionally, all of the frames and points in the reconstruction may be optimized (global optimization). In at least some embodiments, this optimization may be performed according to the refinement process described in the section titled Opt-keyframe reconstruction refinement to optimize all the points and cameras together.

Output

As indicated at 118 of FIG. 2, at least the camera intrinsic parameters and the Euclidean motion parameters for the images in the input image sequence may be output. Note that the reconstruction may have been cropped to the largest contiguous set of frames, as described in section A11.

Example Applications

The output (at least the camera intrinsic parameters and the Euclidean motion parameters for the images in the input image sequence) of the general SFM technique described above may be used in a wide range of applications in different domains including 3D image-based modeling and rendering, video stabilization, panorama stitching, video augmentation, vision based robot navigation, human-computer interaction, etc.

Figure 10A:
FIGS. 10A through 10F are example frames extracted from a video sequence in which results of an SFM technique as described herein were used to insert a 3D object, according to at least some embodiments.

FIGS. 10A through 10F are six example frames extracted from a video sequence in which results of an SFM technique as described herein were used to insert a 3D object into a video sequence, according to at least some embodiments. In these Figures, a 3D object (the word "DOG") has been inserted into the video sequence using the camera intrinsic parameters and the Euclidean motion parameters determined from the video sequence using an embodiment of the general SFM technique as described herein. Note that motion of the frames in the input video sequence includes non-zero rotation and translation components, and that the scene is not dominated by a single plane. FIG. 10A shows a first frame at or near the start of the video (time 00:00:00).

Figure 10B:
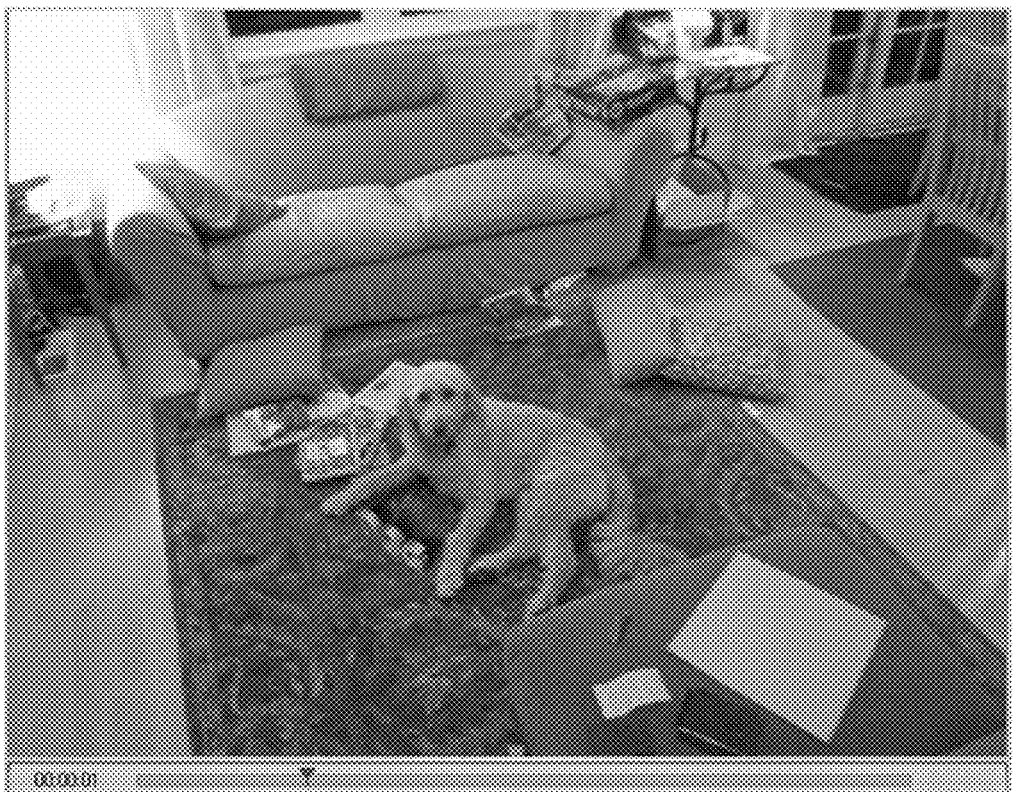
Figure 10C:
Figure 10D:
Figure 10E:
Figure 10F:
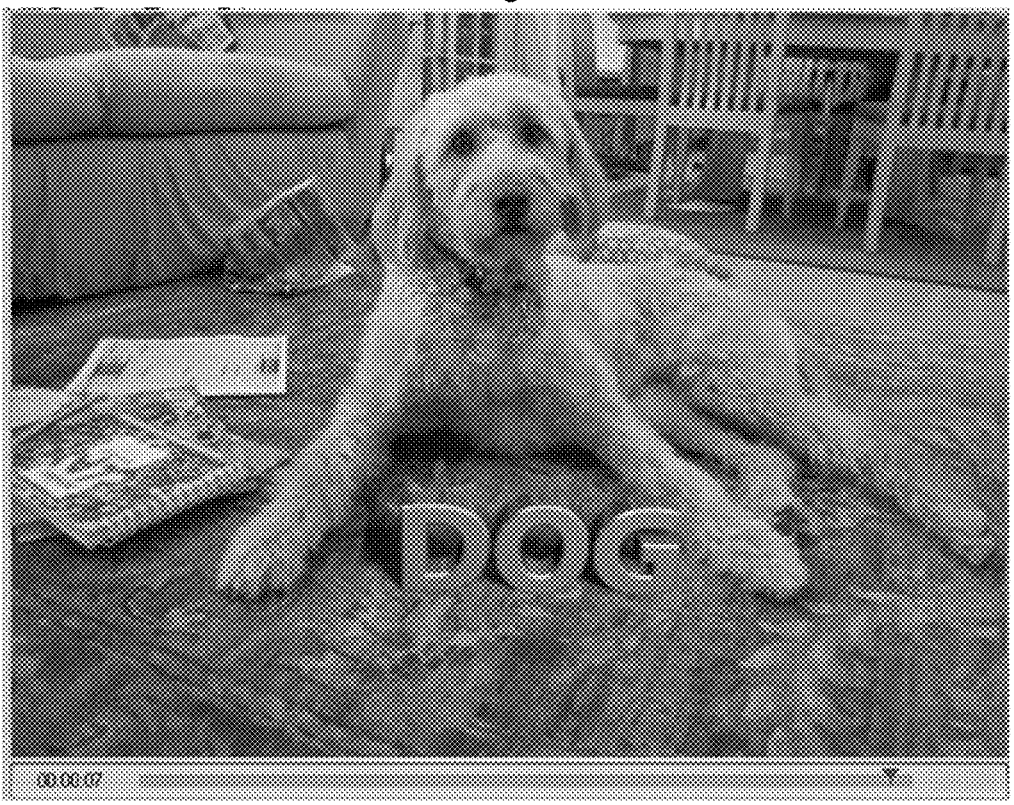

FIG. 10B shows a frame at around one second, FIG. 10C shows a frame at around two seconds, FIG. 10D shows a frame at around three seconds, FIG. 10E shows a frame at around five seconds, and FIG. 10F shows a frame at around seven seconds. Note how the inserted 3D object (the word "DOG") moves with the motion of the camera to maintain a natural and believable positioning in the frames.

Nonlinear Self-Calibration Technique

Introduction

Embodiments of a nonlinear self-calibration technique are described. In contrast to conventional self-calibration methods that use linear or semi-linear algorithms, embodiments of the self-calibration technique may use a nonlinear least squares optimization technique to infer the parameters. In addition, a technique is described for initializing the parameters for the nonlinear optimization. Embodiments of the self-calibration technique may be robust (i.e., may generally produce reliable results), and can make full use of prior knowledge if available. In addition, embodiments of the nonlinear self-calibration technique work for both constant focal length and varying focal length.

Embodiments of the nonlinear self-calibration technique may use prior knowledge of the camera intrinsic parameters (e.g., focal length). For instance, if the user knows the focal length or if the focal length is known through metadata of the captured images in the sequence, the known focal length may be used in the formulation to provide reliable calibration results (e.g., motion parameters). However, having such prior knowledge would not make much difference in most conventional linear self-calibration methods. Embodiments of the nonlinear self-calibration technique may be robust and efficient when compared to conventional self-calibration techniques. In particular, the nonlinear optimization problem that is solved may be sparse and may be implemented efficiently.

Embodiments of the nonlinear self-calibration technique may allow a metric (Euclidian) reconstruction to be obtained where otherwise only a projective reconstruction could be obtained. A projective reconstruction may be unfit for many practical applications. For instance, it is difficult if not impossible to insert a virtual object into a moving video using a projective reconstruction (see FIGS. 10A through 10F for an example of inserting a virtual object (the 3D word "DOG") into a video sequence).

Figure 9:
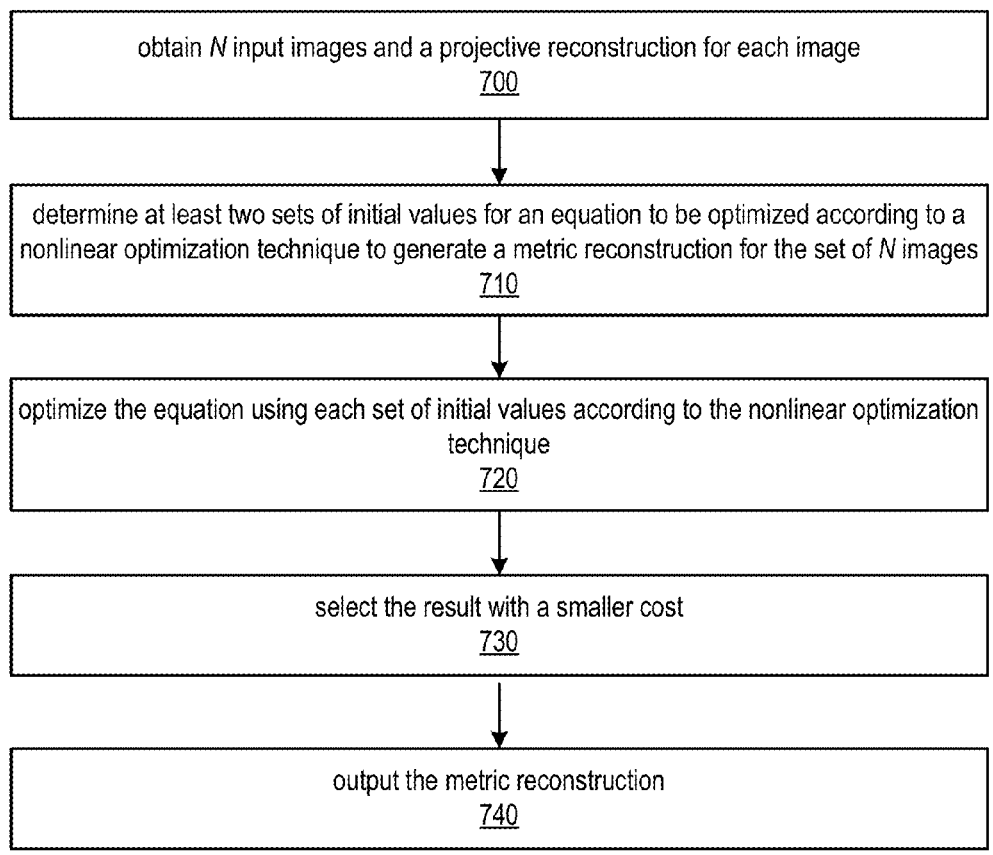
FIG. 9 is a high-level flowchart of a nonlinear self-calibration technique, according to at least some embodiments.

FIG. 9 is a high-level flowchart of a nonlinear self-calibration technique, according to at least some embodiments. As indicated at 700, N input images and a projective reconstruction for each image may be obtained. As indicated at 710, at least two sets of initial values may be determined for an equation to be optimized according to a nonlinear optimization technique to generate a metric reconstruction for the set of N images. As indicated at 720, the equation may then be optimized using each set of initial values according to the nonlinear optimization technique. As indicated at 730, the result with a smaller cost may be selected. As indicated at 740, the metric reconstruction is output. In at least some embodiments, the output may include, but is not limited to, focal length, rotation, and translation values for the N images.

The elements of FIG. 9 are discussed in more detail below.

Self-calibration

Embodiments of the nonlinear self-calibration technique may address a problem in camera motion estimation—determining the intrinsic parameters of the cameras such as focal length. There are two general methods for obtaining intrinsic camera parameters from images. One method is conventional calibration, where the camera intrinsic parameters are determined from one or more captured images of a known calibration target or known properties of the scene such as vanishing points of orthogonal directions. The other method is generally referred to as self-calibration. In a self-calibration method, the camera intrinsic parameters are determined directly from constants on the internal and/or external parameters. Self-calibration is generally more useful in practice because a calibration target or known properties of the scene are typically not available.

Nonlinear Self-Calibration Details

Assume N input images and that for each image a 3×4 projection matrix has been obtained:

$$P_i \in R^{3\times 4}, i=1,2,\ldots,N.$$

A goal of self-calibration is to find a 4×4 matrix $H \in \square^{4\times 4}$ such that $P_i H$ is a metric reconstruction. Mathematically, this means that there exists a set of upper triangular matrices $K_i \in \square^{3\times 3}$ with $K_i(2,1)=K_i(3,1)=K_i(3,2)=0$, rotation matrices $R_i \in SO(3)$, and translation vectors $T_i \in \square^3$ such that:

$$P_i H \square K_i[R_i, T_i], i=1,2,\ldots,N. \tag{B1}$$

where ~ indicates equality up to a scale. Note that solving $T_i$ jointly with $K_i$ and $R_i$ does not add any additional constraint compared to solving $K_i$ and $R_i$ alone. In other words, equation (B1) is equivalent to the following reduced version where $T_i$ has been dropped:

$$P_i H_1 \square K_i R_i, i=1, 2, \ldots, N. \tag{B2}$$

where $H_1 \in \square^{4\times 3}$ is the left 4×3 part of H. Further note that there is a generic ambiguity on $R_i$ in the sense that if $(H_1, R_i)$ satisfies equation (B2), then $(H_1 R, R_i R)$ satisfies the same equation where R is an arbitrary 3×3 rotation matrix. Without loss of generality, $R_1$ is chosen to be the identity rotation. Also note that $P_i$ contains a projective ambiguity. In order to at least partially fix the ambiguity, $P_1$ may be chosen to be [I, 0]. In the following discussion, it is assumed that $P_1$ has this expression.

If $K_i$ is allowed to vary arbitrarily, the problem is not well-defined. For instance, for any given $H_1 \in \square^{3\times 4}$, a decomposition similar to the QR decomposition may be performed to find an upper triangular matrix and a rotation matrix that satisfy the constraint. Embodiments of the self-calibration technique may exploit the assumptions on $K_i$ to arrive at interesting solutions. In embodiments the following assumptions may be made about the camera intrinsic matrix $K_i$:

The principal point is known, which is typically but not necessarily at the center of the image. The principal point may be different for different images.

The pixel skew is 0 (the pixel grid is perpendicular).

The pixel aspect ratio is known.

Note that embodiments of the self-calibration technique can be generalized to cases where different assumptions are made. Under these assumptions, the effect of principal point, pixel skew, and pixel aspect ratio on both $P_i$ and $K_i$ can be undone, and a simpler formulation may be derived:

$$\overline{P}_i H_i \square \text{diag}\{f_i, f_i, 1\} R_i,\ i=1, 2, \ldots, N. \tag{B3}$$

where $f_i$ is the focal length of the i-th camera, $\overline{P}_i \in \square^{3\times 4}$ is $P_i$ modulo the principal point, pixel skew, and pixel aspect ratio, and diag{a, b, c} is a 3×3 diagonal matrix:

$$\text{diag}\{a, b, c\} \square \begin{bmatrix} a & & \\ & b & \\ & & c \end{bmatrix}. \tag{B4}$$

Equation (B3) may be examined for the case of i=1. Since $P_1=[I, 0]$ and $R_1=I$, the following may be obtained:

$$H_{11} \square \text{diag}\{f_1, f_1, 1\}, \tag{B5}$$

where $H_{11}$ is the top 3×3 part of $H_1$. Without loss of generality, the following may be chosen:

$$H_{11} = \text{diag}\{f_1, f_1, 1\}. \tag{B6}$$

Note that in general, $P_i$ is noisy, i.e., there does not exist a solution for equation (B3). By choosing $H_{11}$ with this particular form, a bias towards the first image is created since the equation is always satisfied for i=1.

Equation (B3) becomes:

$$\overline{P}_{i1} \text{diag}\{f_1, f_1, 1\} + \overline{P}_{i2} H_{21} \square \text{diag} R_i,\ i=1, 2, \ldots, N. \tag{B7}$$

where $\overline{P}_{i1}$ and $\overline{P}_{i2}$ are the left 3×3 part and the right 3×1 part of $\overline{P}_{i1}$ respectively and $H_{21}$ is the bottom 1×3 part of $H_1$. An auxiliary variable $\lambda_i$ may be introduced to convert the equality up to a scale equation (B7) into an exact equality as follows:

$$\overline{P}_{i1} \text{diag}\{f_1, f_1, 1\} + \overline{P}_{i2} H_{21} = \lambda_i \text{diag}\{f_1, f_1, 1\} R_i,\ i=1, 2, \ldots, N. \tag{B8}$$

The self-calibration problem becomes solving $H_{21}$ and $\lambda_i$, $f_i$, $R_i$ for i=1, 2, . . . , N in equation (B8).

Prior Knowledge on Focal Length

Some prior knowledge on the focal length may be assumed. For instance, if the lens and camera that are used to capture the image are known, an approximate focal length can be computed from the focal length of the lens and parameters of the camera sensor. The lens information may, for example, be obtained from image/video metadata. In at least some embodiments, if the lens and/or the camera are not known, since many if not most scenes where people need camera tracking are captured using relatively wide-angle lenses, it may be assumed that the focal length is in the range from 24 mm to 35 mm (35 mm equivalent). A discussion of extending the self-calibration technique to the case where there is no prior knowledge of the focal length in the section titled No prior knowledge on focal length.

Two cases are presented below: constant focal length for the entire sequence, and varying focal length.

Constant Focal Length

In the case of constant focal length, $f_i$ is assumed to be the same for all the images, and may be denoted by f. The self-calibration problem may be solved according to an optimization process. In at least some embodiments, the following cost function may be optimized:

$$\arg\min_{f, R_i, T_i} \sum_i^N \left\| \frac{1}{\lambda_i} \text{diag}\left\{\frac{1}{f}, \frac{1}{f}, 1\right\} (\overline{P}_{i1} \text{diag}\{f, f, 1\} + \overline{P}_{i2} H_{21}) - R_i \right\|^2. \tag{B9}$$

A reason for using this type of cost function is that $R_i$ has components at the same scale (between −1 and 1), and the summation over i makes sense. Since equation (B9) is of the form of nonlinear least squares, in at least some embodiments the Levenberg-Marquardt algorithm may be used to optimize the cost.

In order to use the Levenberg-Marquardt algorithm, initial values for all the unknowns are needed. Prior knowledge on the focal length may be used here. Let $\hat{f}$ be the approximate focal length. Good initial values for $H_{21}$, $R_i$ and $\lambda_i$ are also needed. A conventional algorithm for computing $H_{21}$ exists. However, the conventional algorithm only gives a partial solution. More precisely, there are two solutions for $H_{21}$, and the conventional algorithm only computes one of the two solutions. This makes the conventional algorithm unsuitable for the nonlinear optimization problem presented herein because the conventional algorithm may pick the wrong solution for $H_{21}$ from the two solutions, and a nonlinear optimization starting from the wrong solution may not converge to the correct solution for the nonlinear optimization problem.

The following describes an algorithm for computing the two solutions for $H_{21}$ that may be used in at least some embodiments. A pair of projection matrices is chosen, one of which is the first image. The choice of the other projection matrix may be important. In at least some embodiments, the camera that is farthest away from the first image in time may be chosen. Without loss of generality, assume $(P_1, P_2)$ are chosen. The following is computed:

$$t_2 = \text{diag}\left\{\frac{1}{f}, \frac{1}{f}, 1\right\} P_{22} \tag{B10}$$

There exists a rotation matrix $R_s$, such that:

$$R_s t_2 = [\|t_2\|, 0, 0]^T \tag{B11}$$

The following is computed:

$$W = R_s \text{diag}\left\{\frac{1}{f}, \frac{1}{f}, 1\right\} P_{21} \text{diag}\{f, f, 1\} \tag{B12}$$

The two solutions for $H_{21}$ are given by:

$$\begin{cases} -\frac{1}{\|t_2\|}\left(W_1 - \frac{W_2 \times W_3}{\|W_3\|}\right) \\ -\frac{1}{\|t_2\|}\left(W_1 + \frac{W_2 \times W_3}{\|W_3\|}\right) \end{cases} \tag{B13}$$

where $W_1$, $W_2$, and $W_3$ are the rows of W: $W^T = [W_1, W_2, W_3]^T$. It can be verified that the two solutions are both valid. The two solutions correspond to the choice of the sign of $P_2$. Since $P_2$ is up to a scale, which can be either positive or negative, two solutions for $H_{21}$ are obtained In at least some embodiments, $R_i$ and $\lambda_i$ may be computed as follows. For a given $H_{21}$, a QR decomposition may be computed as follows:

$$\text{diag}\left\{\frac{1}{\hat{f}}, \frac{1}{\hat{f}}, 1\right\}\{\overline{P}_{i1}\text{diag}\{\hat{f}, \hat{f}, 1\} + \overline{P}_{i2}\hat{H}_{21}\} = A_i\hat{R}_i \quad \text{(B14)}$$

where $A_i$ is a 3×3 upper triangular matrix and $\hat{R}_i$ is a 3×3 rotation matrix. In at least some embodiments, the technique sets $\lambda_i = A(3, 3)$ and uses $\hat{R}_i$ as the initial value for $R_i$.

The above provides initial values for $H_{21}$, $R_i$, and $\lambda_i$. Equation (B9) may be optimized, for example using a Levenberg-Marquardt technique. Since there are two solutions for $H_{21}$, there are two sets of initial values. In at least some embodiments, two optimizations are performed, one using each set of initial values. The result with the smaller cost may be chosen. Note that equation (B9) has a sparse form, and can be optimized efficiently using a sparse solver.

Varying Focal Length

In the varying focal length case, the focal length changes for each image. In at least some embodiments, a generalization of the algorithm in the section titled Constant focal length may be used for the varying focal length case. Again, without loss of generality, $P_1$ and $P_2$ are chosen to compute $H_{21}$. The following is computed:

$$t_2 = \text{diag}\left\{\frac{1}{f_2}, \frac{1}{f_2}, 1\right\}P_{22} \quad \text{(B15)}$$

and the rotation matrix $R_s$ is found such that:

$$R_s t_2 = [\|t_2\|, 0, 0]^T. \quad \text{(B16)}$$

The following is computed:

$$W = R_s\text{diag}\left\{\frac{1}{f_2}, \frac{1}{f_2}, 1\right\}\overline{P}_{21}\text{diag}\{f_1, f_1, 1\} \quad \text{(B17)}$$

The two solutions for $H_{21}$ are given by:

$$\begin{cases} -\frac{1}{\|t_2\|}\left(W_1 - \frac{W_2 \times W_3}{\|W_3\|}\right) \\ -\frac{1}{\|t_2\|}\left(W_1 + \frac{W_2 \times W_3}{\|W_3\|}\right) \end{cases} \quad \text{(B18)}$$

In at least some embodiments, once $H_{21}$ is computed, $R_i$ and $\lambda_i$ can be computed using the same algorithm presented in the section titled Constant focal length. However, the optimization may be modified to optimize over $f_i$ as well:

$$\arg\min_{f_i, R_i, T_i} \sum_i^N \left\| \frac{1}{\lambda_i}\text{diag}\left\{\frac{1}{f_i}, \frac{1}{f_i}, 1\right\}(\overline{P}_{i1}\text{diag}\{f_1, f_1, 1\} + \overline{P}_{i2}H_{21}) - R_i \right\|^2. \quad \text{(B19)}$$

No Prior Knowledge on Focal Length

Embodiments of the nonlinear self-calibration technique as described herein may be robust to error in the initial estimate of the focal length. The optimization tends to converge even if the focal length estimate is off by as much as 20%. Since in practice accurate prior knowledge may often not be available or attainable, this robustness is advantageous. The robustness of the nonlinear self-calibration technique also suggests a way to handle cases where there is no prior knowledge on the focal length. Note that the focal length has a bounded domain in □. In at least some embodiments, a brute-force search may be used. Let $f_{min}$ and $f_{max}$ be the minimum and maximum focal length. In the constant focal length case, the range may be divided into M bins as follows:

$$f_i = f_{min}\exp\left(\frac{i-1}{M}\log\frac{f_{max}}{f_{min}}\right), i = 1, 2, \ldots, M \quad \text{(B20)}$$

Each $f_i$ may be used as the initial value for f, and the optimization may be performed. The result with the least cost may be returned.

For the varying focal length case, the same range may be divided into M bins, and, for all possible pairs of $(f_i, f_j)$ (where i=1.2, ..., M and j=1, 2, ..., M, as the initial values for $(f_1, f_2)$), the optimization may be performed. The result with the least cost may be returned.

In contrast to conventional self-calibration techniques, embodiments of the self-calibration technique described herein find two solutions to $H_{21}$ that correspond to the two different signs of $P_2$. Finding only one solution, as is done in conventional self-calibration techniques, may result in the wrong solution being picked for at least the reason that the sign of $P_2$ is inconsistent. In addition, embodiments of the self-calibration technique described herein employ a nonlinear optimization to further refine the solution. This makes the self-calibration technique robust to errors in the initial guess of the focal length.

Bundle Adjustment Technique

In computer vision, bundle adjustment is the task of refining a reconstruction for a set of images or frames to obtain jointly optimal structure and motion parameter estimates. Optimal as used here indicates that the parameter estimates are found by minimizing some cost function that quantifies the model fitting error, while jointly as used here means that the solution is simultaneously optimal with respect to both structure and motion variations. The name "bundle adjustment" refers to the "bundles" of light rays leaving each three-dimensional (3D) point and converging on each camera center, which are then adjusted optimally with respect to both point and camera parameters. Bundle adjustment techniques may be employed in many computer vision techniques or workflows involving the processing of multiple images or frames, including but not limited to structure from motion (SFM) techniques.

A bundle adjustment technique is described that may detect and remove poorly conditioned points during bundle adjustment. The bundle adjustment technique may include a method to detect poorly conditioned points during the bundle adjustment process or portion of a feature-based 3D reconstruction pipeline, for example one or more of the reconstruction techniques such as the general 3D SFM technique described herein or a rotation-based SFM technique. Once the poorly conditioned points are detected, the poorly conditioned points are removed from the bundle adjustment process. The technique may detect and remove the poorly conditioned points before optimization, and therefore may help to ensure that the optimization is successful.

The technique for detecting and removing poorly conditioned points may be employed at each application of bundle adjustment in a feature-based 3D reconstruction pipeline. The detection technique may be performed, and detected poorly conditioned points may be removed, prior to the optimization portion of the bundle adjustment technique. In at least some embodiments of the bundle adjustment technique, one or more structures for the optimization may be set up or initialized according to an input reconstruction. The detection technique may be applied to detect poorly conditioned points, and the poorly conditioned points may be collected and removed or marked so that they are not used during the optimization. The optimization may then be performed using only the well-conditioned points. Bundle adjustment may generally be an iterative optimization process, and thus the optimization output may be used as input to another iteration in which setup, the detection technique and point removal, and optimization are again performed. After bundle adjustment has completed, an optimized reconstruction that contains jointly optimal structure and motion parameter estimates may be output.

In at least some embodiments of the bundle adjustment technique, the Levenberg-Marquardt (L-M) algorithm may be used in bundle adjustment. In particular, a sparse bundle adjustment implementation using the L-M algorithm may be used in some embodiments. The detection technique can be applied at each iteration of the L-M algorithm (i.e., at every new Jacobian computation) to detect and remove poorly conditioned points prior to optimization at the current iteration of the L-M algorithm.

In a sparse bundle adjustment implementation using the L-M technique, a Jacobian matrix may be computed for an input reconstruction, and a 3×3 matrix $V_i$ may be computed for all the points. The rank of $V_i$ for all the points may then be checked. If $V_i$ for a given point does not have full rank (rank 3), the matrix is rank-deficient and the corresponding point is declared or marked as poorly conditioned. All of the poorly conditioned points are collected and removed together. The bundle adjustment optimization can then be performed using the set of remaining, well-conditioned points. In at least some embodiments, detecting rank deficiency can be done numerically by checking the distribution of the eigenvalues of matrix $V_i$.

Example Implementations

Some embodiments may include a means for generating structure and motion for a set of images or frames according to the SFM techniques described herein. For example, an SFM module may receive input specifying a set of point trajectories and generate as output structure and motion for a set of images or frames as described herein. The SFM module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module(s) may be at least partially implemented by hardware circuitry and/or firmware stored, for example, in a non-volatile memory.

Figure 11:
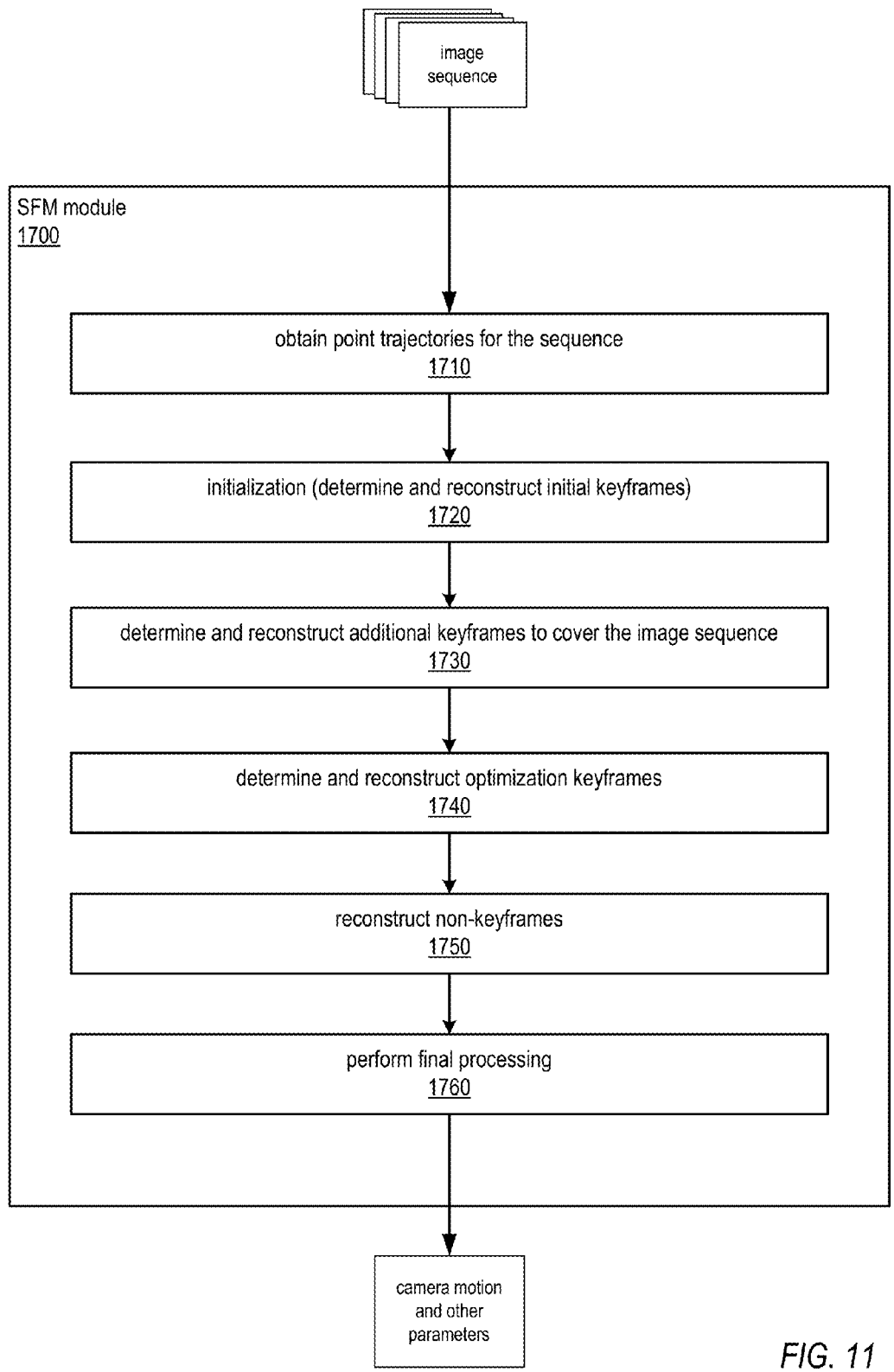
FIG. 11 illustrates a module that may implement one or more of the Structure from Motion (SFM) techniques and algorithms as described herein, according to at least some embodiments.
Figure 12:
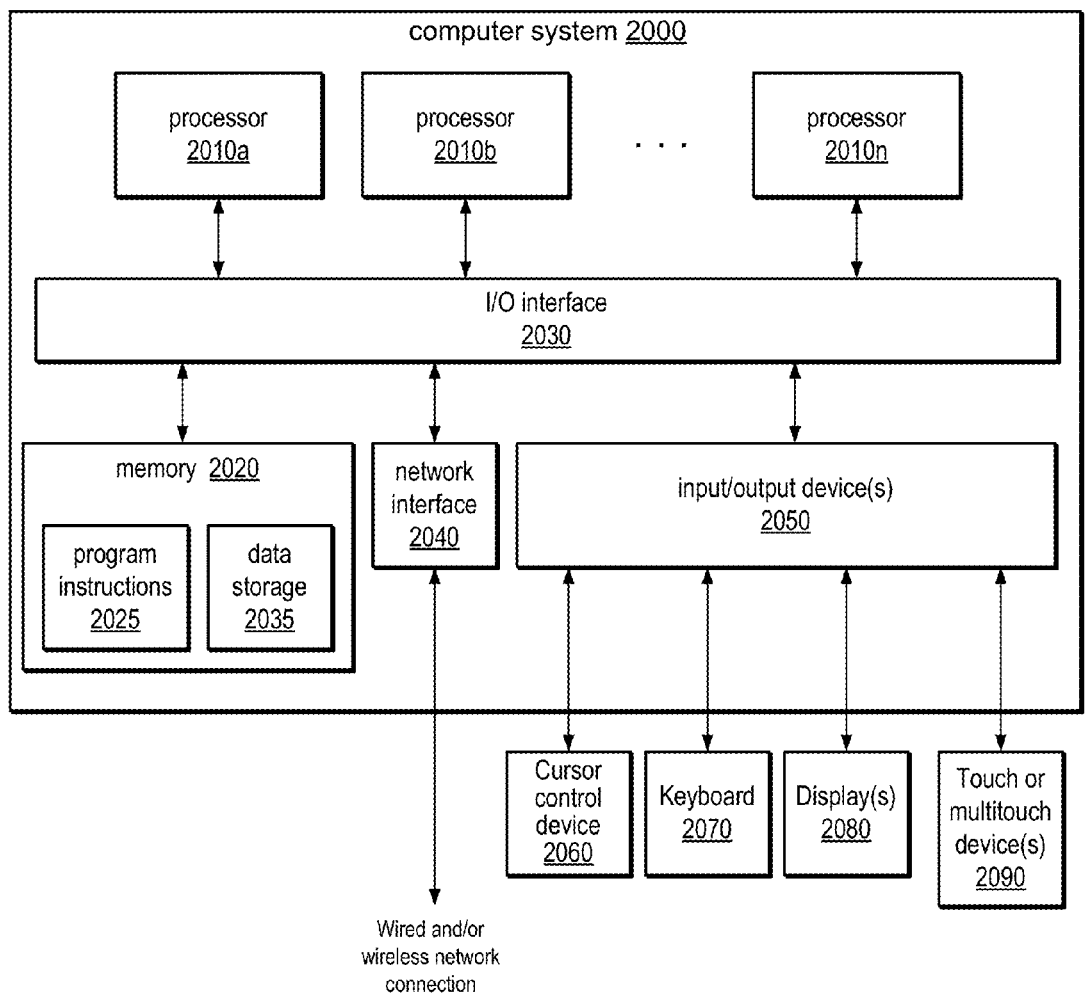
FIG. 12 illustrates an example computer system that may be used in embodiments.

Embodiments of the module may, for example, be implemented as a stand-alone application, as a module of an application, as a plug-in or plug-ins for applications including image or video processing applications, and/or as a library function or functions that may be called by other applications such as image processing or video processing applications. Embodiments of the module may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example module that may implement one or more of the SFM techniques as described herein is illustrated in FIG. 11. An example computer system on which the module may be implemented is illustrated in FIG. 12. Note that the module may, for example, be implemented in still cameras and/or video cameras.

FIG. 11 illustrates a module that may implement an SFM technique as illustrated in the accompanying Figures and described herein, according to at least some embodiments. Module 1700 may, for example, receive an input image sequence, or alternatively a set of point trajectories for the images in a sequence. Module 1700 then applies one or more of the techniques as described herein to generate structure, camera parameters, and motion. In at least some embodiments, module 1700 may obtain point trajectories for the sequence, as indicated at 1710. Module 1700 may then perform initialization to determine and reconstruct initial keyframes, as indicated at 1720. Module 1700 may then determine and reconstruct additional keyframes to cover the video sequence, as indicated at 1730. Module 1700 may then determine and reconstruct optimization keyframes, as indicated at 1740. Module 1700 may then reconstruct non-keyframes, as indicated at 1750. Module 1700 may then perform final processing, as indicated at 1760. In at least some embodiments, module 1700 may generate as output estimates of camera parameters and camera motion for the image sequence.

Example Applications

Example applications of the SFM techniques as described herein may include one or more of, but are not limited to, video stabilization, video augmentation (augmenting an original video sequence with graphic objects), video classification, and robot navigation. In general, embodiments of one or more of the SFM techniques may be used to provide structure and motion to any application that requires or desires such output to perform some video- or image-processing task.

Example System

Embodiments of the various techniques as described herein including the reconstruction techniques for generating structure, camera parameters, and motion from point trajectories may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a video camera, a tablet or pad device, a smart phone, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multitouch-enabled device(s) 2090. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, be implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, configured to implement embodiments of the various techniques as described herein, and data storage 2035, comprising various data accessible by program instructions 2025. In one embodiment, program instructions 2025 may include software elements of embodiments of the various techniques as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the various techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        obtaining an initial reconstruction of camera motion and camera intrinsic parameters for an image sequence including a plurality of frames, wherein the initial reconstruction covers a portion of the image sequence; and
        selecting a next frame to be added to the current reconstruction from a subset of the plurality of frames that are not covered by the current reconstruction;
        reconstructing camera motion and camera intrinsic parameters for the selected frame according to the current reconstruction and at least a portion of a set of point trajectories for the image sequence, wherein said reconstructing adds the selected frame to the current reconstruction; and
        repeating said selecting and said reconstructing until the current reconstruction covers the image sequence.

2. The method as recited in claim 1, wherein the next frame is selected from a set of keyframes, wherein the set of keyframes is a temporally spaced subset of the plurality of frames of the image sequence.

3. The method as recited in claim 1, wherein said selecting a next frame to be added to the current reconstruction from a subset of the plurality of frames that are not covered by the current reconstruction comprises:
    selecting a direction in the image sequence in which to select the next frame;
    selecting a candidate frame r1 at a distance from a last frame in the current reconstruction according to the selected direction;
    computing the number of overlapping points s1 between the candidate frame r1 and the last frame in the current reconstruction; and
    if s1 is below a threshold, selecting r1 as the next frame.

4. The method as recited in claim 3, further comprising, if s1 is not below the threshold:
    selecting a new candidate frame r2 at a distance from r1 according to the selected direction;
    computing the number of overlapping points s2 between the candidate frame r2 and the last frame in the current reconstruction;
    if s1 equals s2 or if s2 is above the threshold, setting r1 to r2 and repeating said selecting a new candidate frame r2 and said computing the number of overlapping points s2; otherwise, selecting the current r1 as the next frame.

5. The method as recited in claim 1, further comprising, subsequent to adding the selected frame to the current reconstruction, globally optimizing the current reconstruction, wherein said globally optimizing the current reconstruction refines the current reconstruction according to a nonlinear optimization technique applied globally to the current reconstruction.

6. The method as recited in claim 5, further comprising, after said globally optimizing the current reconstruction, determining one or more outlier points in the current reconstruction and removing the determined outlier points from the current reconstruction, wherein the outlier points are added to a set of current outlier points.

7. The method as recited in claim 6, wherein said determining one or more outlier points in the current reconstruction comprises computing reprojection errors for all points in the current reconstruction, wherein the one or more outlier points are points for which the reprojection error is above a threshold.

8. The method as recited in claim 5, further comprising, after said globally optimizing the current reconstruction, determining one or more inlier points from the set of outlier points and adding the determined inlier points to the current reconstruction.

9. The method as recited in claim 8, wherein said determining one or more inlier points from the set of outlier points comprises computing reprojection errors for at least one of the outlier points in the set of outlier points, wherein the one or more inlier points are determined according to the computed reprojection errors.

10. The method as recited in claim 8, further comprising performing another global optimization of the current reconstruction upon determining that more than a threshold number of inlier points were added to the current reconstruction.

11. The method as recited in claim 5, further comprising, after said globally optimizing the current reconstruction, applying a self-calibration technique to at least two frames in the current reconstruction to estimate camera intrinsic parameters for the at least two frames.

12. The method as recited in claim 1, further comprising, upon determining that the current reconstruction is a projective reconstruction:
applying a self-calibration technique to the current reconstruction to convert the projective reconstruction to a Euclidian reconstruction;
if the self-calibration technique is successful, accepting the Euclidian reconstruction as the current reconstruction; and
if the self-calibration technique is not successful, reverting the current reconstruction to the projective reconstruction.

13. The method as recited in claim 1, further comprising, upon determining that the current reconstruction is a projective reconstruction:
computing a total reprojection error for the projective reconstruction;
applying a self-calibration technique to the current reconstruction to convert the projective reconstruction to a Euclidian reconstruction;
computing a total reprojection error for the Euclidian reconstruction;
comparing the total reprojection error for the projective reconstruction to the total reprojection error for the Euclidian reconstruction;
if the total reprojection error for the Euclidian reconstruction is less than or equal to a pre-defined factor of the total reprojection error for the projective reconstruction, accepting the Euclidian reconstruction as the current reconstruction; and
if the total reprojection error for the Euclidian reconstruction is greater than the pre-defined factor of the total reprojection error for the projective reconstruction, reverting the current reconstruction to the projective reconstruction.

14. A system, comprising:
one or more processors; and
a memory comprising program instructions, wherein the program instructions are executable by at least one of the one or more processors to:
obtain an initial reconstruction of camera motion and camera intrinsic parameters for an image sequence including a plurality of frames, wherein the initial reconstruction covers a portion of the image sequence; and
select a next frame to be added to the current reconstruction from a subset of the plurality of frames that are not covered by the current reconstruction;
reconstruct camera motion and camera intrinsic parameters for the selected frame according to the current reconstruction and at least a portion of a set of point trajectories for the image sequence, wherein said reconstructing adds the selected frame to the current reconstruction; and
repeat said select and said reconstruct until the current reconstruction covers the image sequence.

15. The system as recited in claim 14, wherein the program instructions are further executable by at least one of the one or more processors to, subsequent to adding the selected frame to the current reconstruction, globally optimize the current reconstruction according to a nonlinear optimization technique.

16. The system as recited in claim 15, wherein the program instructions are further executable by at least one of the one or more processors to, after said globally optimizing the current reconstruction:
determine one or more outlier points in current initial reconstruction and remove the determined outlier points from the initial reconstruction, wherein the outlier points are added to a set of current outlier points;
determine one or more inlier points from the set of outlier points and add the determined inlier points to the current reconstruction; and
if more than a threshold number of inlier points were added to the current reconstruction, globally optimize the current reconstruction according to the nonlinear optimization technique.

17. The system as recited in claim 14, wherein the program instructions are further executable by at least one of the one or more processors to:
apply a self-calibration technique to the current reconstruction to convert the current reconstruction from a projective reconstruction to a Euclidian reconstruction;
if the self-calibration technique is successful, accept the Euclidian reconstruction as the current reconstruction; and
if the self-calibration technique is not successful, revert the current reconstruction to the projective reconstruction.

18. A non-transitory computer-readable storage medium storing program instructions, wherein the program instructions are computer-executable to implement:
obtaining an initial reconstruction of camera motion and camera intrinsic parameters for an image sequence including a plurality of frames, wherein the initial reconstruction covers a portion of the image sequence; and
selecting a next frame to be added to the current reconstruction from a subset of the plurality of frames that are not covered by the current reconstruction;
reconstructing camera motion and camera intrinsic parameters for the selected frame according to the current reconstruction and at least a portion of a set of point trajectories for the image sequence, wherein said reconstructing adds the selected frame to the current reconstruction; and
repeating said selecting and said reconstructing until the current reconstruction covers the image sequence.

19. The non-transitory computer-readable storage medium as recited in claim 18, wherein the program instructions are further computer-executable to implement, subsequent to adding the selected frame to the current reconstruction, globally optimizing the current reconstruction according to a nonlinear optimization technique.

20. The non-transitory computer-readable storage medium as recited in claim 19, wherein the program instructions are further computer-executable to implement, after said globally optimizing the current reconstruction:
determining one or more outlier points in current initial reconstruction and removing the determined outlier points from the initial reconstruction, wherein the outlier points are added to a set of current outlier points;
determining one or more inlier points from the set of outlier points and adding the determined inlier points to the current reconstruction; and
if more than a threshold number of inlier points were added to the current reconstruction, globally optimizing the current reconstruction according to the nonlinear optimization technique.

21. The non-transitory computer-readable storage medium as recited in claim 18, wherein the program instructions are further computer-executable to implement:
- applying a self-calibration technique to the current reconstruction to convert the current reconstruction from a projective reconstruction to a Euclidian reconstruction;
- if the self-calibration technique is successful, accepting the Euclidian reconstruction as the current reconstruction; and
- if the self-calibration technique is not successful, reverting the current reconstruction to the projective reconstruction.

* * * * *